United States Patent
Kurasawa et al.

(10) Patent No.: US 10,459,551 B2
(45) Date of Patent: Oct. 29, 2019

(54) SENSOR-EQUIPPED DISPLAY DEVICE

(71) Applicant: Japan Display Inc., Tokyo (JP)

(72) Inventors: Hayato Kurasawa, Tokyo (JP); Koji Ishizaki, Tokyo (JP); Tomohiko Otani, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 413 days.

(21) Appl. No.: 15/085,338

(22) Filed: Mar. 30, 2016

(65) Prior Publication Data
US 2016/0291759 A1    Oct. 6, 2016

(30) Foreign Application Priority Data
Apr. 2, 2015    (JP) ................. 2015-076146

(51) Int. Cl.
*G06F 3/044*    (2006.01)
*G06F 3/041*    (2006.01)
*G02F 1/1333*    (2006.01)

(52) U.S. Cl.
CPC ........ *G06F 3/0412* (2013.01); *G02F 1/13338* (2013.01); *G06F 3/044* (2013.01); *G06F 3/0416* (2013.01); *G06F 2203/04101* (2013.01)

(58) Field of Classification Search
None
See application file for complete search history.

(56) References Cited

U.S. PATENT DOCUMENTS

| | | | |
|---|---|---|---|
| 8,741,424 B2* | 6/2014 | Takahashi | B29C 59/002 |
| | | | 345/173 |
| 8,889,244 B2* | 11/2014 | Mizuno | G06F 3/044 |
| | | | 345/173 |
| 9,119,305 B2* | 8/2015 | Takahashi | B29C 59/002 |
| 9,316,858 B2* | 4/2016 | Yabuta | G02F 1/1347 |
| 9,715,290 B2* | 7/2017 | Kim | G06F 3/044 |
| 9,811,217 B2* | 11/2017 | Kim | G06F 3/044 |
| 2009/0315859 A1* | 12/2009 | Chien | G06F 3/044 |
| | | | 345/175 |
| 2010/0045625 A1* | 2/2010 | Yang | G06F 3/044 |
| | | | 345/173 |

(Continued)

FOREIGN PATENT DOCUMENTS

CN    1764895    4/2006
CN    101937298    1/2011

(Continued)

OTHER PUBLICATIONS

Chinese Office Action dated May 25, 2018 in corresponding Chinese Application No. 2016102043068.

(Continued)

*Primary Examiner* — Chanh D Nguyen
*Assistant Examiner* — Karin Kiyabu
(74) *Attorney, Agent, or Firm* — K&L Gates LLP

(57) ABSTRACT

According to one embodiment, a sensor-equipped display device includes a display panel including pixel electrodes and common electrodes, a cover member opposed to the display panel, a polarizer located between the display panel and the cover member, and a first detection module located between the polarizer and the cover member. The first detection module includes a first detection electrode including dot-like openings and a dummy module including dot-like dummy electrodes.

9 Claims, 15 Drawing Sheets

(56) References Cited

U.S. PATENT DOCUMENTS

| | | | |
|---|---|---|---|
| 2010/0108409 A1 | 5/2010 | Tanaka | |
| 2010/0309162 A1* | 12/2010 | Nakanishi | G06F 3/044 345/174 |
| 2010/0321308 A1* | 12/2010 | Lin | G06F 3/044 345/173 |
| 2011/0267293 A1* | 11/2011 | Noguchi | G06F 3/0416 345/173 |
| 2011/0291963 A1* | 12/2011 | Woo | G06F 3/0412 345/173 |
| 2012/0062480 A1* | 3/2012 | Lin | G06F 3/0202 345/173 |
| 2012/0218198 A1* | 8/2012 | Shin | G06F 3/0412 345/173 |
| 2013/0189502 A1* | 7/2013 | Takahashi | B29C 59/002 428/195.1 |
| 2013/0265244 A1* | 10/2013 | Kim | G06F 3/044 345/173 |
| 2014/0043569 A1* | 2/2014 | Yabuta | G02F 1/13338 349/104 |
| 2014/0104507 A1* | 4/2014 | Yamazaki | G02F 1/13338 349/12 |
| 2014/0176492 A1* | 6/2014 | An | G06F 3/044 345/174 |
| 2014/0246225 A1* | 9/2014 | Mizuno | G06F 3/044 174/255 |
| 2014/0267159 A1 | 9/2014 | Miyazaki et al. | |
| 2014/0285737 A1* | 9/2014 | Takahashi | B29C 59/002 349/12 |
| 2014/0338960 A1 | 11/2014 | Inoue et al. | |
| 2015/0021156 A1* | 1/2015 | Inoue | G06F 3/044 200/600 |
| 2015/0029116 A1* | 1/2015 | Kim | G06F 3/0416 345/173 |
| 2015/0060120 A1* | 3/2015 | Park | G06F 3/044 174/257 |
| 2015/0060256 A1* | 3/2015 | Kim | G06F 3/044 200/600 |
| 2015/0084887 A1* | 3/2015 | Kuo | G06F 1/1643 345/173 |

FOREIGN PATENT DOCUMENTS

| | | |
|---|---|---|
| CN | 102650917 | 8/2012 |
| CN | 103460160 | 12/2013 |
| CN | 104007862 | 8/2014 |
| CN | 104054139 | 9/2014 |
| CN | 104054140 | 9/2014 |
| CN | 104345969 | 2/2015 |
| CN | 104423760 | 3/2015 |
| JP | 2010-113516 | 5/2010 |
| JP | 2010253813 | 11/2010 |
| JP | 2014-178847 | 9/2014 |

OTHER PUBLICATIONS

Chinese Office Action dated Jan. 16, 2019 in corresponding Chinese Application No. 201610204306.8 (partial translation).

Chinese Office Action dated Jun. 24, 2019 in corresponding Chinese Application No. 201610204306.8.

* cited by examiner

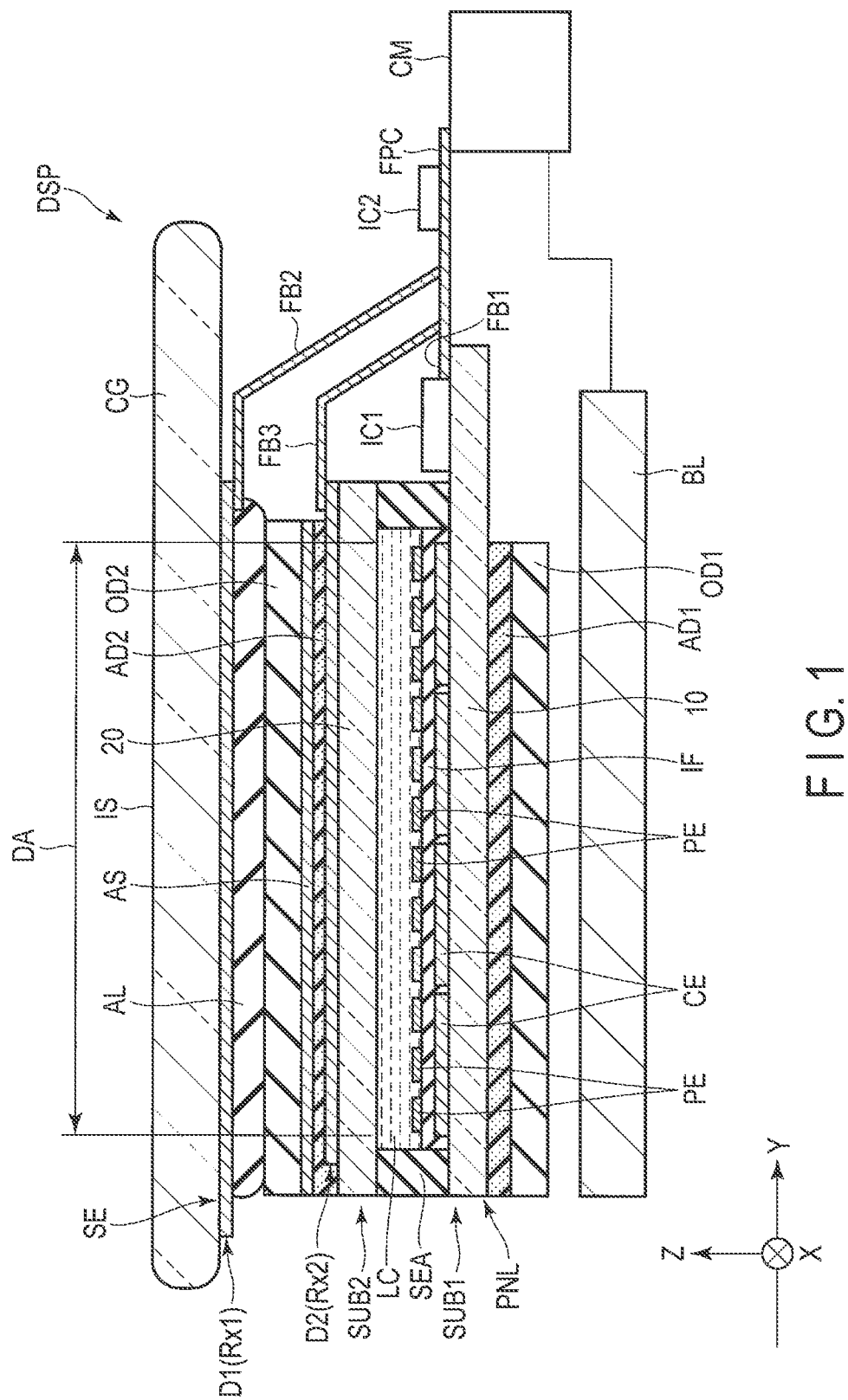
F I G. 1

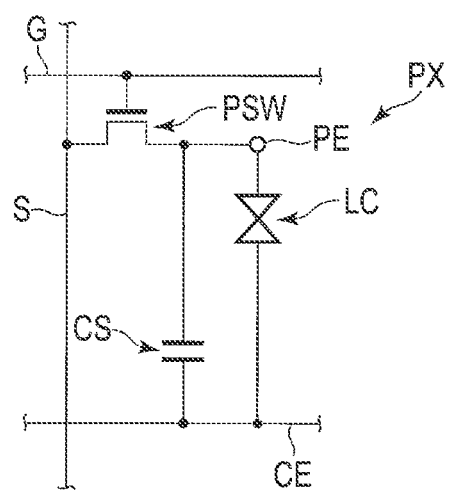
F I G. 4

SENSOR-EQUIPPED DISPLAY DEVICE

CROSS-REFERENCE TO RELATED APPLICATIONS

This application is based upon and claims the benefit of priority from Japanese Patent Application No. 2015-076146, filed Apr. 2, 2015, the entire contents of which are incorporated herein by reference.

FIELD

Embodiments described herein relate generally to a sensor-equipped display device.

BACKGROUND

Recently, sensor-equipped display devices comprising sensors (often called touch panels) which detect contact or approach of an object, have been put into practical use. As an example of the sensor, a capacitive sensor capable of detecting contact or approach of a conductor such as a finger, based on a variation in electrostatic capacitance is well known. A detection electrode and a sensor driving electrode constituting the sensor are disposed in a display area in which images are displayed, and opposed to each other with a dielectric interposed between the electrodes.

SUMMARY

The present application generally relates to a sensor-equipped display device.

In an embodiment, a sensor-equipped display device is provided. The sensor-equipped display device includes a display panel including pixel electrodes and common electrodes located in a display area in which an image is displayed, wherein each of the common electrodes is formed in a band shape; a cover member opposed to the display panel; a polarizer located between the display panel and the cover member; and a first detection module located between the polarizer and the cover member, wherein the first detection module comprises a first detection electrode including dot-like openings and a dummy module including dot-like dummy electrodes.

In another embodiment, a sensor-equipped display device is provided. The sensor-equipped display device includes a display panel including pixel electrodes and common electrodes located in a display area in which an image is displayed, wherein each of the common electrodes is formed in a band shape; a cover member opposed to the display panel; a polarizer located between the display panel and the cover member; and a first detection module located between the polarizer and the cover member, wherein the first detection module comprises a first detection electrode including openings which are formed to extend along imaginary grid lines and arranged to be spaced apart from each other, and a dummy module including dummy electrodes which are arrayed in matrix and cause a grid-like gap portion extending along the grid lines to appear.

BRIEF DESCRIPTION OF THE DRAWINGS

FIG. 1 is a cross-sectional view showing a configuration of the liquid crystal display device of the first embodiment.

FIG. 4 is an equivalent circuit diagram showing a pixel shown in FIG. 3.

DETAILED DESCRIPTION

Figure 2:
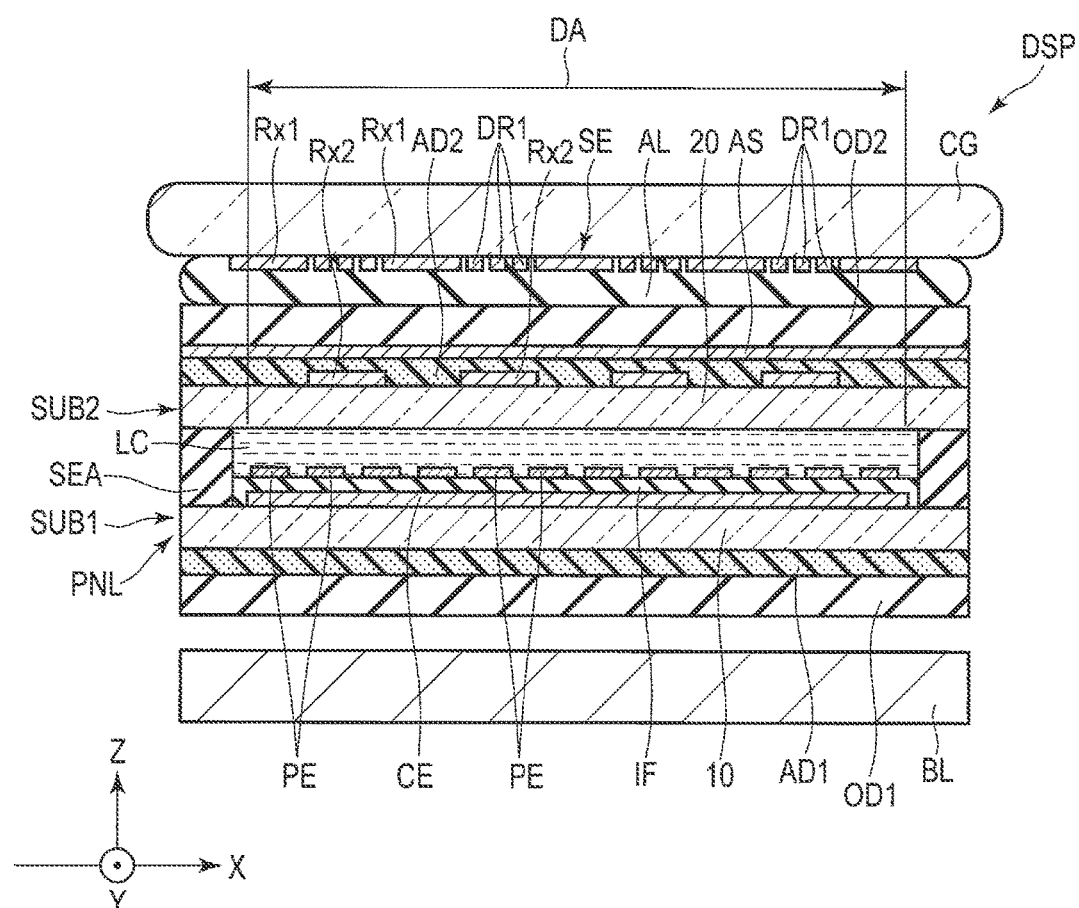
FIG. 2 is another cross-sectional view showing the configuration of the liquid crystal display device shown in FIG. 1.

In general, according to one embodiment, there is provided a sensor-equipped display device, comprising: a display panel including pixel electrodes and common electrodes located in a display area in which an image is displayed, wherein each of the common electrodes is formed in a band shape; a cover member opposed to the display panel; a polarizer located between the display panel and the cover member; and a first detection module located between the polarizer and the cover member. The first detection module comprises a first detection electrode including dot-like openings and a dummy module including dot-like dummy electrodes.

According to another embodiment, there is provided a sensor-equipped display device, comprising: a display panel including pixel electrodes and common electrodes located in a display area in which an image is displayed, wherein each of the common electrodes is formed in a band shape; a cover member opposed to the display panel; a polarizer located between the display panel and the cover member; and a first detection module located between the polarizer and the cover member. The first detection module comprises a first detection electrode comprising openings which are formed to extend along imaginary grid lines and arranged to be spaced apart from each other, and a dummy module comprising dummy electrodes which are arrayed in matrix and cause a grid-like gap portion extending along the grid lines to appear.

Embodiments and modifications will be described hereinafter with reference to the accompanying drawings. The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In the present specification and drawings, after structural elements are each explained once with reference to the drawings, there is a case where their explanations will be omitted as appropriate, and those identical to or similar to the explained structural elements will be denoted by the same reference numbers, respectively, as the explained structural elements.

First Embodiment

First, a sensor-equipped display device of the first embodiment will be explained. In the present embodiment, the display device is a liquid crystal display device. FIG. 1 is a cross-sectional view showing a configuration of the liquid crystal display device of the first embodiment.

As shown in FIG. 1, the liquid crystal display device DSP comprises an active-matrix liquid crystal display panel PNL, a driver IC chip IC1 which drives the liquid crystal display panel PNL, a cover member CG, a first optical element OD1, a second optical element OD2, a first detection module D1, a second detection module D2, a driver IC chip IC2 which drives the liquid crystal display panel PNL, the first detection module D1 and the second detection module D2, a backlight unit BL which illuminates the liquid crystal display panel PNL, a control module CM, and a flexible printed circuit FPC.

The liquid crystal display panel PNL includes a plate-like first substrate SUB1, a plate-like second substrate SUB2 disposed to be opposed to the first substrate SUB1, and a liquid crystal layer LC held between the first substrate SUB1 and the second substrate SUB2. The liquid crystal display panel PNL also includes a display area (active area) DA on which an image is displayed. The first substrate SUB1 and the second substrate SUB2 are bonded outside the display area DA by a sealing member SEA. For example, the first substrate SUB1 is formed based on a first insulating substrate 10 having a light transmitting property such as a glass substrate or a resin substrate. The first substrate SUB1 includes common electrodes CE, pixel electrodes PE, an insulating film IF interposed between the common electrodes CE and the pixel electrodes PE, and the like, on a side of the first insulating substrate 10, which is opposed to the second substrate SUB2. The pixel electrodes PE are formed of a transparent conductive material such as indium tin oxide (ITO), indium zinc oxide (IZO), zinc oxide (ZnO) or the like. The common electrodes CE are arranged in a second direction Y so as to be spaced apart from each other. The second substrate SUB2 is formed based on a second insulating substrate 20 having a light transmitting property such as a glass substrate or a resin substrate.

The liquid crystal display panel PNL depicted in the figure has a configuration corresponding to a fringe field switching (FFS) mode as its display mode, may have a configuration corresponding to the other display modes. For example, the liquid crystal display panel PNL may have a configuration corresponding to an in-plane switching (IPS) mode using a lateral electric field approximately parallel to a main substrate surface. In the display mode using the lateral electric field, for example, a configuration comprising both the pixel electrodes PE and the common electrodes CE on the first substrate SUB1 can be used. Alternatively, the liquid crystal display panel PNL may have a configuration corresponding to a mode using a vertical electric field generated on a main substrate surface, such as twistic nematic (TN) mode, optically compensated bend (OCB) mode, and vertical aligned (VA) mode. In the display mode using the longitudinal electric field, for example, a configuration comprising the pixel electrodes PE on the first substrate SUB1 and comprising the common electrodes CE on the second substrate SUB2 can be used. It should be noted that the main substrate surface is a surface parallel to an X-Y plane defined by a first direction X and a second direction Y orthogonal to each other.

The first direction X and the second direction Y are orthogonal to each other, but may cross at an angle other than 90°. A third direction Z is orthogonal to each of the first direction X and the second direction Y. The third direction Z corresponds to a thickness direction of the liquid crystal display panel PNL.

In the present embodiment, the first substrate SUB1 can be restated as an array substrate and the second substrate SUB2 can be restated as a counter-substrate. The liquid crystal display panel PNL is a transmissive type display panel having a transmissive display function of displaying images by selectively transmitting the light from the backlight unit BL. The liquid crystal display panel PNL may be a transreflective liquid crystal display panel having a reflective display function of displaying images by selectively reflecting outside light, besides the transmissive display function.

The backlight unit BL is disposed on a back surface side of the first substrate SUB1. Various types of units are applicable as the backlight unit BL and a backlight unit using a light-emitting diode (LED) as a light source is also applicable, but descriptions of a detailed structure of the backlight unit BL are omitted. If the liquid crystal display panel PNL is in a reflective type having the reflective display function alone, the backlight unit BL is excluded.

The cover member CG is overlaid on the liquid crystal display panel PNL in a state of being opposed to the second substrate SUB2. In the present example, the input surface IS of the liquid crystal display device DSP is the surface of the cover member CG. The liquid crystal display device DSP can detect position information of a portion in which a finger or the like contacts or approaches on the input surface IS. A planar size (i.e., a size in the X-Y plane seen from the Z direction) of the cover member CG is greater than that of the second substrate SUB2 or the first substrate SUB1, in view of the X-Y plane. The cover member CG is longer than the second substrate SUB2 and the first substrate SUB1 in the second direction Y. The cover member CB is formed of, for example, a glass substrate. In this case, the cover member CB is often called a cover glass. Alternately, the cover member CG can be formed of a substrate having a light transmitting property such as a resin substrate.

The first optical element OD1 is interposed between the first insulating substrate 10 and the backlight unit BL. The first optical element OD1 is bonded on the first insulating substrate 10 by an adhesive AD1. The second optical element OD2 is located between the liquid crystal display panel PNL and the cover member CG. The second optical element OD2 is bonded on the second insulating substrate 20 and the second detection module D2 by an adhesive AD2. Each of the first optical element OD1 and the second optical element OD2 includes at least a polarizer and may include a retardation film as needed. An absorption axis of the polarizer included in the first optical element OD1 intersects an absorption axis of the polarizer included in the second optical element OD2. For example, the absorption axes of the polarizers are orthogonal to each other.

An antistatic layer AS is disposed between the second optical element OD2 and the adhesive AD2 to prevent charging of the second optical element OD2. However, the antistatic layer AS may be disposed in the liquid crystal display device DSP as needed.

The first detection module D1 is located between the second optical element OD2 (polarizer) and the cover member CG. The first detection module D1 is disposed below a surface of the cover member CG, which is opposed to the second optical element OD2. The first detection module D1 comprises a first detection electrode Rx1 extending in the second direction Y, and the like.

In the present embodiment, the first detection module D1 is located remote from the cover member CG and a thin-film member such as an insulating film (not shown) is interposed between the first detection module D1 and the cover member CG. For example, the first detection module D1 is substantially disposed on the cover member CG by applying a film or a sheet on which the first detection module D1 is patterned on the cover member CG. As methods other than the above-explained method of forming the first detection module D1 on the cover member CG, for example, a conventionally known method such as formation of the insulating film on the surface of the cover member CG, formation of the conductive film on the insulating film, exposure of the patterning to the conductive film in the photolithography, and development of the conductive film can be employed.

The first detection module D1 may be formed directly on the surface of the cover member CG.

The cover member CG on which the first detection module D1 is formed is bonded onto the second optical element OD2 by an adhesive layer AL. For example, the adhesive layer AL is formed by coating the cover member CG side or the second optical element OD2 side with a super view resin (SVR), bonding the cover member CG and the second optical element OD2 while sandwiching the super view resin to form a super view resin film, and curing the formed super view resin film.

The second detection module D2 is located between the common electrodes CE and the second optical element OD2 (polarizer). In the present embodiment, the second detection module D2 is disposed above the surface of the second insulating substrate 20, which is opposed to the second optical element OD2. For this reason, the second detection module D2 may be in contact with the second insulating substrate 20 or may be positioned remote from the second insulating substrate 20. In the latter case, a thin-film member such as an insulating film (not shown) is provided between the second insulating substrate 20 and the second detection module D2. In the present example, an insulating film is interposed between the second detection module D2 and the second insulating substrate 20. The second detection module D2 comprises a second detection electrode Rx2 extending in the second direction Y, and the like. The second detection module D2 has a function of dissipating charges stored in the antistatic layer AS to the outside.

A capacitive sensor SE is formed by the common electrodes CE, the first detection module D1 and the second detection module D2. The common electrode CE functions as an electrode for display and also as a sensor driving electrode.

The driver IC chip IC1 is mounted on the first substrate SUB1 of the liquid crystal display panel PNL. The flexible printed circuit FPC is connected to the control module CM. The flexible printed circuit FPC includes a first branch member FB1, a second branch member FB2 and a third branch member FB3. The first branch member FB1 is connected to the liquid crystal display panel PNL. The second branch member FB2 is connected to the first detection module D1. The third branch member FB3 is connected to the second detection module D2. The driver IC chip IC2 is mounted on the flexible printed circuit FPC.

The driver IC chip IC1 and the driver IC chip IC2 are connected to each other through the flexible printed circuit FPC and the like. Means for interconnecting the control module CM, the liquid crystal display panel PNL, the first detection module D1 and the second detection module D2 can be variously modified. For example, a first flexible printed circuit, a second flexible printed circuit and a third flexible printed circuit, i.e., three independent flexible printed circuits may be used instead of the flexible printed circuit FPC. In this case, the control module CM and the liquid crystal display panel PNL can be connected to each other by the first flexible printed circuit, the control module CM and the first detection module D1 can be connected to each other by the second flexible printed circuit, and the control module CM and the second detection module D2 can be connected to each other by the third flexible printed circuit. As regards the driver IC chip IC2, for example, the driver IC chip IC2 can be mounted on any one of the first to third flexible printed circuits or can be divided and mounted on the respective second and third flexible printed circuits.

The control module CM, the driver IC chip IC1 and the driver IC chip IC2 function as a driving module of the sensor SE. The control module CM can be restated as an application processor. The driver IC chip IC2 can supply a timing signal to inform a driving period of the sensor SE to the driver IC chip IC1. Alternatively, the driver IC chip IC1 can supply a timing signal to inform a driving period of the common electrodes CE to be explained later to the driver IC chip IC2. Alternatively, the control module CM can supply the timing signal to each of the driver IC chip IC1 and the driver IC chip IC2. The driving of the driver IC chip IC1 and the driving of the driver IC chip IC2 can be synchronized with each other by the timing signal.

It should be noted that the control module CM is connected to the backlight unit BL to control the driving of the backlight unit BL.

FIG. 2 is another cross-sectional view showing the configuration of the liquid crystal display device DSP shown in FIG. 1. FIG. 2 shows a cross-section parallel to the X-Z plane while FIG. 1 shows the cross-section parallel to the Y-Z plane.

As shown in FIG. 2, the common electrode CE extends in the first direction X. The first detection electrodes Rx1 extend in the second direction Y and intersect the common electrode CE. Similarly, the second detection electrodes Rx2 extend in the second direction Y and intersect the common electrode CE. In the present embodiment, the first detection electrodes Rx1 and the second detection electrodes Rx2 are alternately arranged in the first direction X in planar view. As regards a pair of the first detection electrode Rx1 and the second detection electrode Rx2 arranged in the first direction X, the first detection electrode Rx1 and the second detection electrode Rx2 are arranged in a direction orthogonal to a direction in which the first detection electrodes Rx1 and the second detection electrodes Rx2 extend.

Edges of the adjacent first detection electrode Rx1 and the second detection electrode Rx2 are located in the same plane. The same plane indicates a Y-Z plane defined by the second direction Y and the third direction Z, and the edges are commonly present in the Y-Z plane. However, a gap may be formed between the edges of the adjacent first detection electrode Rx1 and the second detection electrode Rx2. Alternately, the edges of the adjacent first detection electrode Rx1 and the second detection electrode Rx2 may be opposed to each other in the third direction Z.

Figure 3:
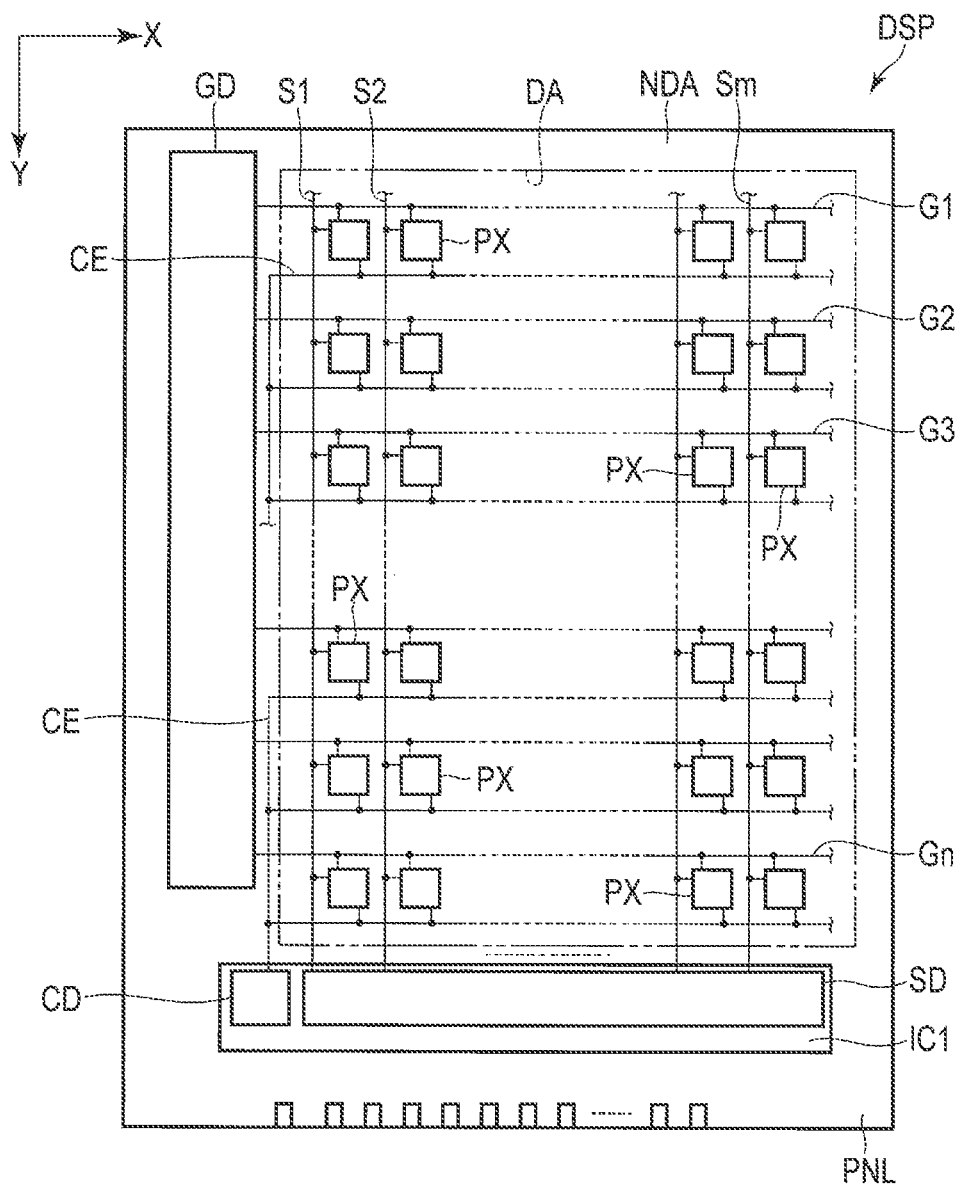
FIG. 3 is an illustration showing a basic configuration and an equivalent circuit, of the liquid crystal display device shown in FIG. 1.

FIG. 3 is an illustration showing a basic configuration and an equivalent circuit, of the liquid crystal display device DSP shown in FIG. 1. As shown in FIG. 3, the liquid crystal display panel PNL includes a gate line driving circuit GD located in a non-display area NDA outside the display area DA. The driver IC chip IC1 is also located in the non-display area NDA. In the present embodiment, the driver IC chip IC1 comprises a source line driving circuit SD and a common electrode driving circuit CD. The driver IC chip IC1 may comprise at least part of the source line driving circuit SD and the common electrode driving circuit CD. The non-display area NDA is in a frame shape surrounding the display area DA or a rectangular shape.

The liquid crystal display panel PNL includes a plurality of pixels PX in the display area DA. The pixels PX are disposed in a matrix in the first direction X and the second direction Y, and m×n pixels are arrayed (where m and n are positive integers). The liquid crystal display panel PNL includes n gate lines G (G1 to Gn), m source lines S (S1 to Sm), common electrodes CE and the like in the display area DA.

The gate lines G extend substantially linearly in the first direction X to be drawn outside the display area DA and connected to the gate line driving circuit GD. The gate lines G are arranged in the second direction Y so as to be spaced apart from each other. The source lines S extend substantially linearly in the second direction Y to be drawn outside the display area DA and connected to the source line driving circuit SD. The source lines S are arranged in the first direction X so as to be spaced apart from each other, and intersect the gate lines G. The gate lines G and the source lines S may not extend linearly, but part of the lines may be bent. The common electrodes CE are disposed in at least the display area DA, and electrically connected to the common electrode driving circuit CD. Each of the common electrodes CE is shared by the pixels PX.

In the present embodiment, three pixels PX arranged in the first direction X are a red pixel, a green pixel and a blue pixel, which constitute one main pixel. Pitches of the pixels PX arranged in the second direction Y are equal in a range of, for example, approximately 50 to 100 μm. If the pixel electrodes PE are arranged in the second direction Y at equal pitches, the pitches of the pixels PX in the second direction Y are regarded as pitches in the second direction Y at centers of the pixel electrodes PE. Alternatively, if the gate lines G are arranged in the second direction Y at equal pitches, the pitches of the pixels PX in the second direction Y are regarded as pitches in the second direction Y at centers of the gate lines G.

In contrast, pitches of the pixels PX arranged in the first direction X are equal or, for example, one third of the pitches of the pixels PX in the second direction Y. If the pixel electrodes PE are arranged in the first direction X at equal pitches, the pitches of the pixels PX in the first direction X are regarded as pitches in the first direction X at centers of the pixel electrodes PE. Alternatively, if the source lines S are arranged in the first direction X at equal pitches, the pitches of the pixels PX in the first direction X are regarded as pitches in the first direction X at centers of the source lines S.

FIG. 4 is an equivalent circuit diagram showing one of the pixels PX shown in FIG. 3.

As shown in FIG. 4, each pixel PX comprises a pixel switching element PSW, the pixel electrode PE, the common electrode CE, the liquid crystal layer LC, and the like. The pixel switching element PSW is formed of, for example, a thin-film transistor. The pixel switching element PSW is electrically connected to the gate line G and the source line S. The pixel switching element PSW may be designed in a top gate type or a bottom gate type. A semiconductor layer of the pixel switching element PSW is formed of, for example, polycrystalline silicon but may be formed of amorphous silicon, an oxide semiconductor or the like. The pixel electrode PE is electrically connected to the pixel switching element PSW. The pixel electrode PE is opposed to the common electrode CE. A storage capacitor CS is formed by the common electrode CE, an insulating film (i.e., the above-explained insulating film IF), and the pixel electrode PE.

Figure 5:
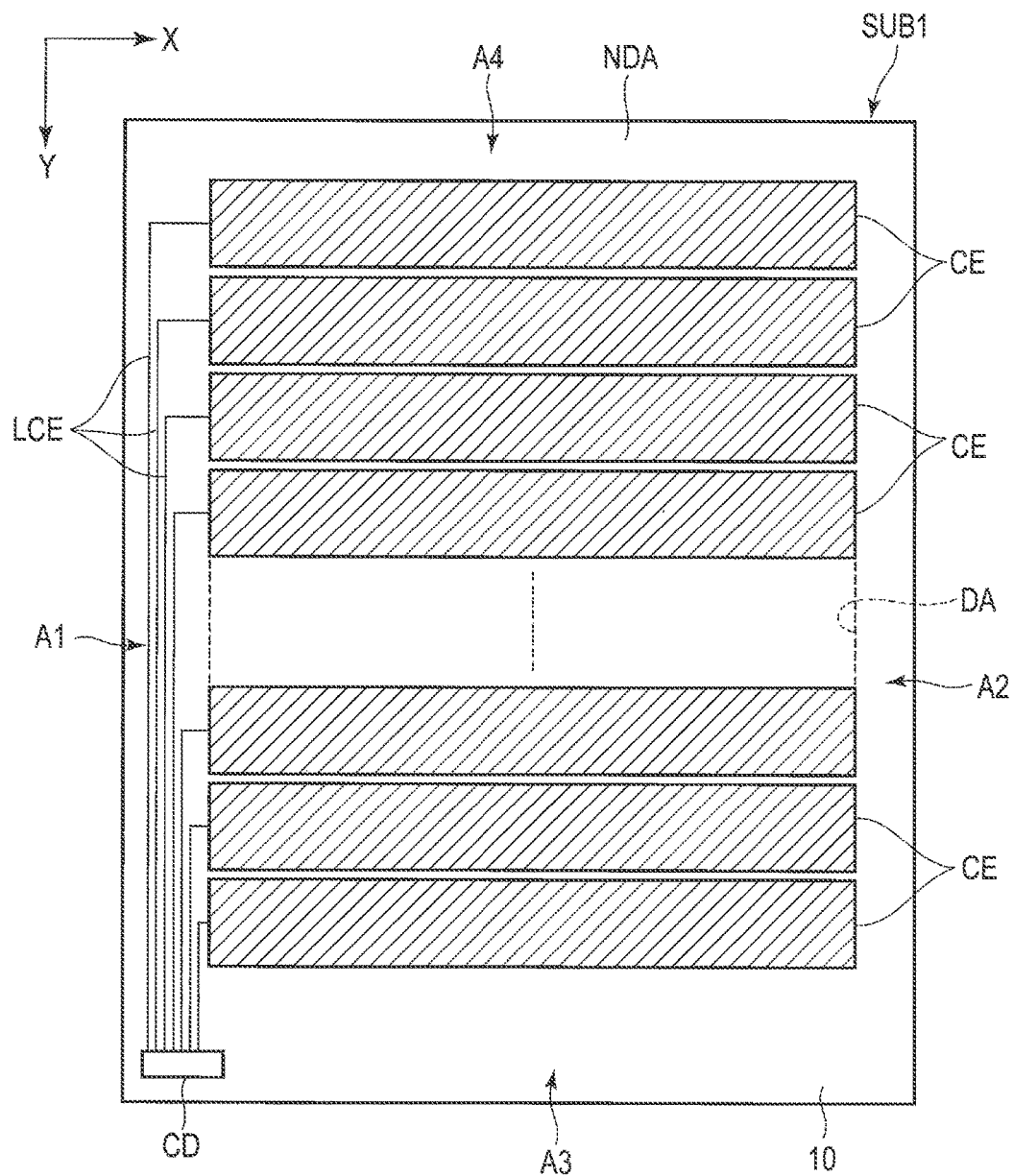
FIG. 5 is a plan view showing a first substrate of the liquid crystal display device, illustrating a first insulating substrate, common electrodes, lead lines and a common electrode driving circuit.

FIG. 5 is a plan view showing the first substrate SUB1 of the liquid crystal display device DSP, illustrating the first insulating substrate 10, the common electrodes CE, lead lines LCE and a common electrode driving circuit CD.

As shown in FIG. 5, each of the common electrodes CE is formed in a band shape. The common electrodes extend in the first direction X, and are arranged in the second direction Y so as to be spaced apart from each other. In the present embodiment, the common electrodes CE are formed in the display area DA but part of the common electrodes CE may be formed to extend up to the non-display area NDA. Each common electrode CE is formed of a transparent conductive material such as ITO, IZO, or ZnO.

The lead lines LCE are located in the non-display area NDA to electrically connect the common electrodes CE to the common electrode driving circuit CD. The lead lines LCE are connected to the common electrodes CE in a one-to-one relationship. The lead lines LCE may be formed of a transparent conductive material such as ITO, IZO or ZnO, similarly to the common electrodes CE, but may be formed of a metal instead of the transparent conductive material.

In the non-display area NDA, a left side of the display area DA is referred to as a first area A1 (i.e., a band-shaped area extending in the second direction Y), a right side of the display area DA is referred to as a second area A2 (i.e., a band-shaped area extending in the second direction Y), a lower side of the display area DA is referred to as a third area A3 (i.e., a band-shaped area extending in the first direction X), and an upper side of the display area DA is referred to as a fourth area A4 (i.e., a band-shaped area extending in the first direction X). For example, the common electrode driving circuit CD is located in the third area A3 in which the first branch member FB1 is located, and the lead lines LCE extend in the first area A1 and the third area A3.

Figure 6:
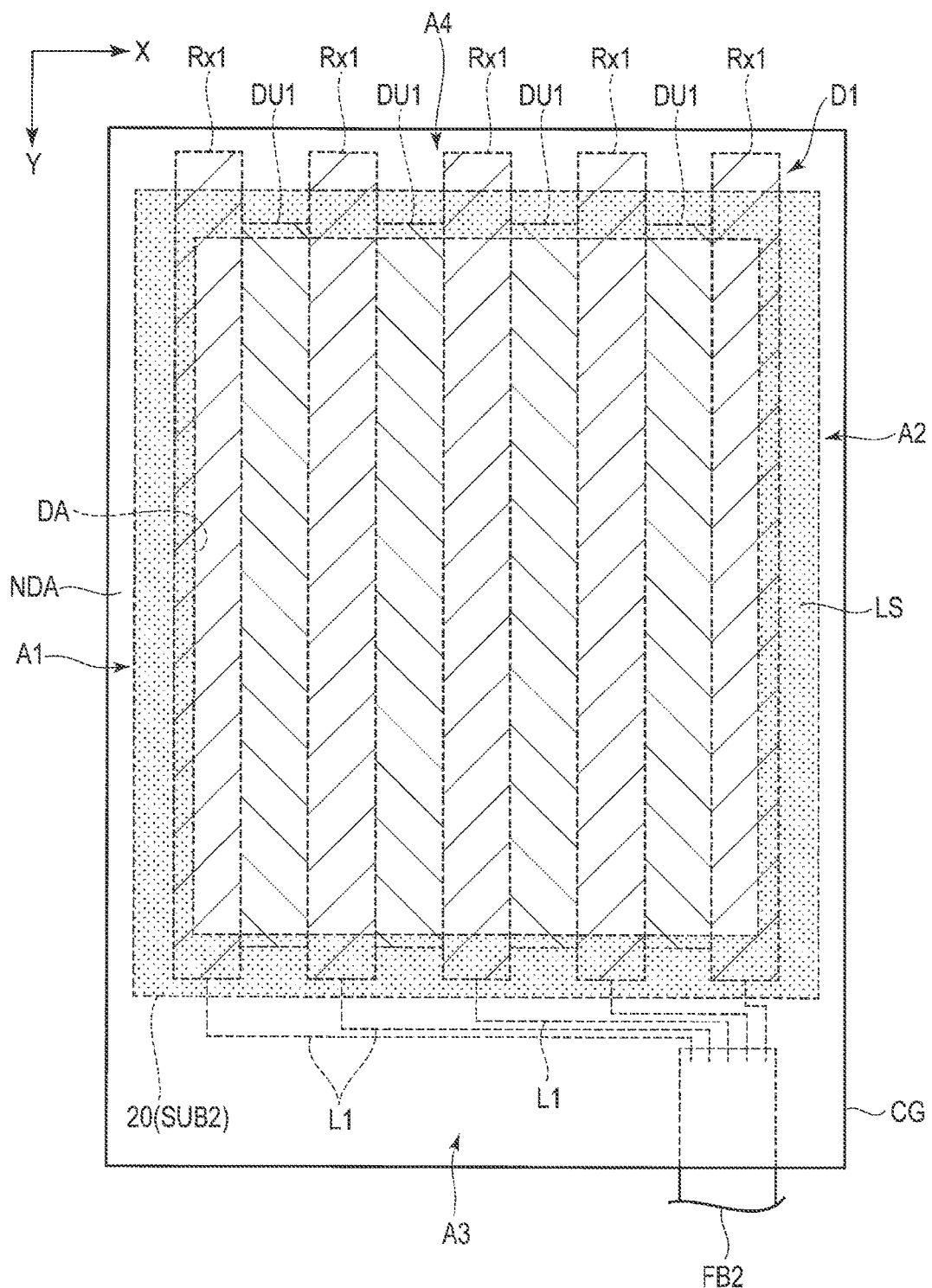
FIG. 6 is a plan view showing a part of the liquid crystal display device, illustrating a cover member, a first detection module, a second branch member of a flexible printed circuit, a second insulating substrate and a peripheral light-shielding layer.

FIG. 6 is a plan view showing a part of the liquid crystal display device DSP, illustrating the cover member CG, the first detection module D1, the second branch member FB2 of the flexible printed circuit FPC, the second insulating substrate 20 and the peripheral light-shielding layer LS. FIG. 6 is a plan view showing the first detection module D1 and the like seen from an opposite direction of the third direction Z.

As shown in FIG. 6, the peripheral light-shielding layer LS is disposed in the non-display area NDA of the second substrate SUB2. The peripheral light-shielding layer LS extends over a substantially entire area of the non-display area NDA of the second substrate SUB2. For example, the peripheral light-shielding layer LS is disposed on a side opposed to the first substrate SUB1 of the second insulating substrate 20.

The first detection module D1 comprises the first detection electrodes Rx1, dummy modules DU1, and lead lines L1. Each of the first detection electrodes Rx1 is formed in a band shape. The first detection electrodes Rx1 extend in the second direction Y, and are arranged in the first direction X so as to be spaced apart from each other.

In the present embodiment, a left edge portion of the first detection electrode Rx1 located on the most left side, of the first detection electrodes Rx1, is located in the first area A1 and opposed to the peripheral light-shield layer LS. A right edge portion of the first detection electrode Rx1 located on the most right side, of the first detection electrodes Rx1, is located in the second area A2 and opposed to the peripheral light-shield layer LS. One-side portions of all the first detection electrodes Rx1 are located in the fourth area A4 and extend up to positions exceeding the upper side of the second substrate SUB2, in an opposite direction of the second direction Y. Since the first detection module D1 is formed on the cover member CG, the first detection electrodes Rx1 can be formed to extend up to positions outside the area opposed to the second substrate SUB2. Other side portions of all the first detection electrodes Rx1 are located in the third area A3 and opposed to the peripheral light-shield layer LS.

The first detection electrodes Rx1 may be located oppositely to the cover member CG or may be formed in the first area A1, the second area A2 or the third area A3 outside of the area opposed to the second substrate SUB2. Input position information of the non-display area NDA can be thereby detected based on detection signals from one, two adjacent or plural first detection electrodes Rx1.

The lead lines L1 are located in the non-display area NDA to electrically connect the first detection electrodes Rx1 to the second branch member FB2. The lead lines L1 are electrically connected to the first detection electrodes Rx1 in a one-to-one relationship. The lead lines L1 extend in the third area A3.

Each dummy module DU1 is disposed between the adjacent first detection electrodes Rx1. The dummy modules DU1 are desirably formed on the entire area of the display area DA except at least the area which the first detection electrodes Rx1 are formed. The dummy modules DU1 are not connected to lines such as the lead lines L1 and are in the electrically floating state.

The first detection electrodes Rx1 and the dummy modules DU1 are formed of a transparent conductive material such as ITO, IZO, or ZnO. The lead lines L1 may be formed of a transparent conductive material such as ITO, IZO or ZnO, similarly to the first detection electrodes Rx1 and the like, but may be formed of thin metal wires having a width of several μm instead of the transparent conductive material.

Figure 7:
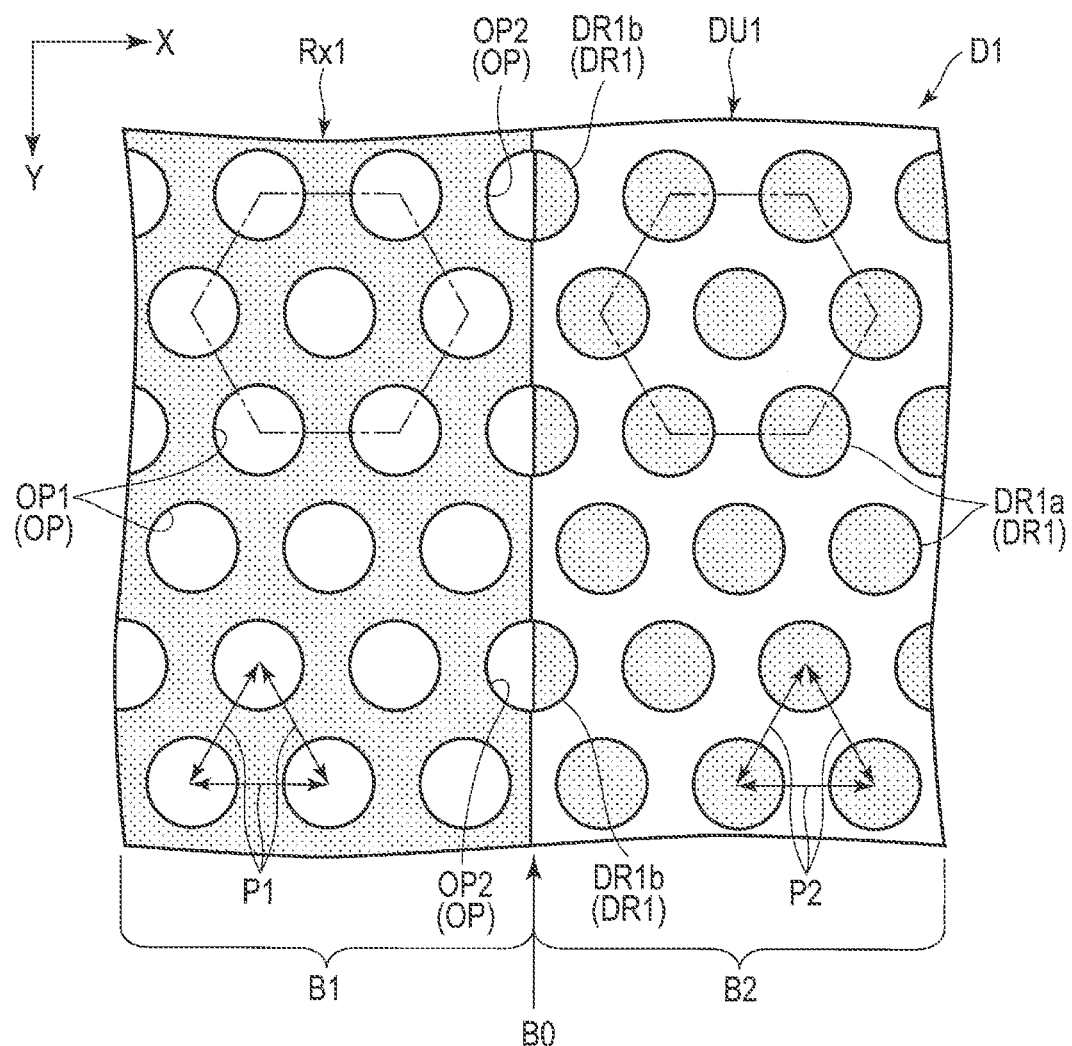
FIG. 7 is a plan view showing a part of the first detection module, illustrating a first detection electrode and dummy electrodes.

FIG. 7 is a plan view showing a part of the first detection module D1, illustrating the first detection electrode Rx1 and dummy electrodes DR1 of the dummy module DU1.

As shown in FIG. 7, the first detection electrode Rx1 includes dot-like openings OP. The dummy module DU1 includes dot-like dummy electrodes DR1. Each of the openings OP and the dummy electrodes DR1 has a circular shape. The openings OP and the dummy electrodes DR1 have the same size (area). In the present embodiment, the shape of the openings OP and the dummy electrodes DR1 is a perfect circle. The shape of the openings OP and the dummy electrodes DR1 may be a circle other than a perfect circle, such as an ellipsoid. Even when the shape of the openings OP and the dummy electrodes DR1 is any circle, light refracted in a specific direction can be prevented from concentrating as compared with a case where the outline of the openings OP and the dummy electrodes DR1 includes a straight side. For this reason, the circular shape of the openings OP and the dummy electrodes DR1 can contribute to the improvement of visibility of the display image.

A pattern in which the openings OP are arranged is the same as a pattern in which the dummy electrodes DR1 are arranged. More specifically, the pattern formed on the cover member CG by the first detection module is made entirely dot-like by arranging the openings OP and the dummy electrodes DR1 in the entire surface of the cover member CG opposed to the second optical element OD2 (or the area opposed to at least the display area DA). In other words, the first detection module has a unique dot pattern, dot portions formed of ITO are the dummy electrodes, and dot portions formed as openings with their surroundings formed of ITO are the detection electrodes. In relation to this point, if the portions formed of ITO are considered positive and the portions at which the cover member surface is exposed (i.e., the portion at which ITO is absent) are considered negative, the positive portions and the negative portions are formed to be mutually inversed at the first detection electrode modules and the dummy electrode modules. All the openings OP and the dummy electrodes DR1 have the same shape on the entire surface and are arranged at equal pitches P1 and P2 (P1=P2). A direction in which the openings OP and the dummy electrodes DR1 are arranged is not particularly limited and can be variously adjusted. Desirably, however, the openings OP and the dummy electrodes DR1 are arranged at equal pitches in a first arrangement direction which is inclined clockwise at an angle in a range of 30 to 35° from the second direction Y, a second arrangement direction which is inclined clockwise at 60° from the first arrangement direction, and a third arrangement direction which is inclined counterclockwise at 60° from the first arrangement direction, in view of the X-Y plane. This is because moire with the layout of the pixels PX can be suppressed and the deterioration in display quality can also be suppressed by adjusting the arrangement directions.

The pitches at which the openings OP and the dummy electrodes DR1 are arranged range from approximately 100 to 200 μm but are not limited to the range and can be variously adjusted. However, the pitches are desirably made to correspond to the pitches of the pixels PX. This is because moire with the layout of the pixels PX can also be suppressed and the deterioration in display quality can also be suppressed by adjusting the arrangement directions. The openings OP include first openings OP1 in a circular shape and second openings OP2 shaped in half of the circular shape of the first openings OP1. The dummy electrodes DR1 include first dummy electrodes DR1a having the same size and shape as the first openings OP1 and second dummy electrodes DR1b shaped in a half of the circular shape of the first dummy electrodes DR1a. A diameter portion of each of the second openings OP2 and a diameter portion of each of the second dummy electrodes DR1b are located on a boundary B0 between the first detection electrode Rx1 and the dummy module DU1 and overlaid in a one-to-one relationship.

As explained above, the first detection electrode Rx1 and the dummy electrodes DR1 are desirably disposed such that circles of the same shape as the shape of the first openings OP or the first dummy electrodes are formed (synthesized) by the arcuate outline of the second openings OP2 and the arcuate outline of the second dummy electrodes DR1b. The boundary between the first detection electrode Rx1 and the dummy module DU1 can hardly be thereby recognized visually for the user.

Synthesized circles which are synthesized by the second openings OP2 and the second dummy electrodes DR1b are arranged along the boundary B0, and the boundary B0 passes through the center of each of the synthesized circles. The synthesized circles are the same in shape and size as the first openings OP1 and the first dummy electrodes DR1a. For this reason, the dot pattern shape is not disturbed near the boundary B0, either.

An area in which the first detection electrode Rx1 is formed is referred to as a sensor region B1 and an area in which the dummy module DU1 is formed is referred to as a dummy region B2. The boundary B0 is also a boundary between the sensor region B1 and the dummy region B2. A proportion of the area of the first detection electrode Rx1 to the sensor region B1 is equal to a proportion of the total area of the dummy electrodes DR1 to the dummy region B2. By making the electrode area equal in a minute area, in any region, the reflectivity in the minute regions can be made equal. Consequently, the reflectivity in each region is made constant, and increase in the visibility of the electrode pattern due to difference in the reflectivity is suppressed. The pattern of the first detection electrode Rx1 and the dummy module DU1 can hardly be thereby recognized visually for the user.

For example, the area of a hexagon depicted which is formed by linking centers of six first openings OP1 surrounding an arbitrary first opening OP1, except the area of the first opening OP1 located inside the hexagon, is referred to as a first area. The total area of a first dummy electrode DR1a located inside the hexagon depicted which is formed by linking the centers of six first dummy electrode DR1a surrounding an arbitrary first dummy electrode DR1a, is referred to as a second area. The first area is thus equal to the second area.

Figure 8:
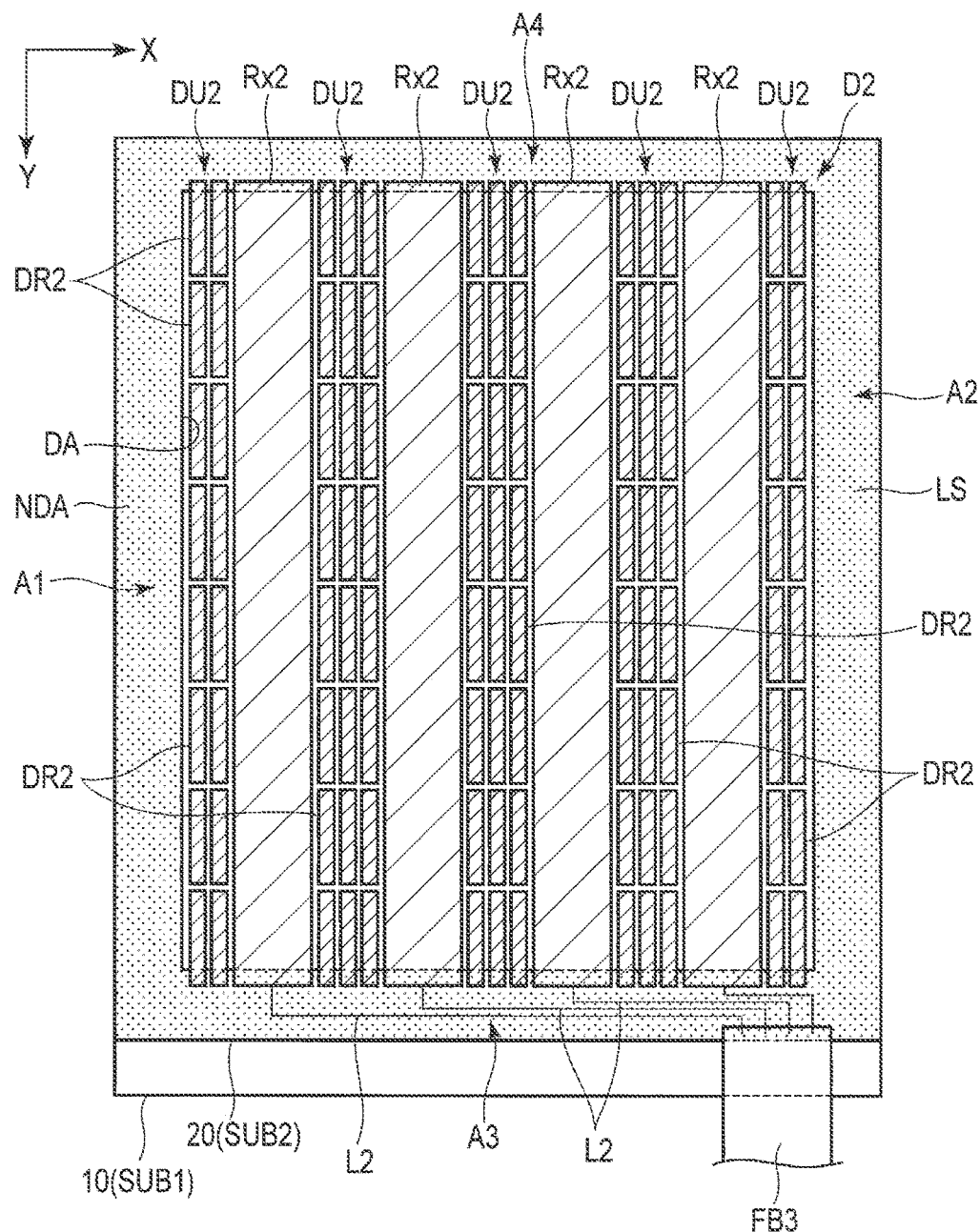
FIG. 8 is a plan view showing a part of the liquid crystal display device, illustrating the first insulating substrate, the second insulating substrate, the peripheral light-shielding layer, the second detection module and a third branch member of the flexible printed circuit.

FIG. 8 is a plan view showing a part of the liquid crystal display device DSP, illustrating the first insulating substrate 10, the second insulating substrate 20, the peripheral light-shielding layer LS, the second detection module D2, and the third branch member FB3 of the flexible printed circuit FPC. FIG. 8 is a plan view showing the second detection module D2 and the like seen from an opposite direction of the third direction Z.

As shown in FIG. 8, the second detection module D2 comprises the second detection electrodes Rx2, dummy modules DU2, and lead lines L2. Each of the second detection electrodes Rx2 is formed in a band shape. The second detection electrodes Rx2 extend in the second direction Y, and are arranged in the first direction X so as to be spaced apart from each other. In the present embodiment, the second detection electrodes Rx2 are opposed to the dummy modules DU1 of the first detection module D1.

The lead lines L2 are located in the non-display area NDA to electrically connect the second detection electrodes Rx2 to the third branch member FB3. The lead lines L2 are electrically connected to the second detection electrodes Rx2 in a one-to-one relationship. The lead lines L2 extend in the third area A3.

Each dummy module DU2 is disposed between the adjacent second detection electrodes Rx2. The dummy modules DU2 are desirably formed on the entire area of the display area DA except at least the area which the second detection electrodes Rx2 are formed. The dummy modules DU2 are not connected to lines such as the lead lines L2 and are in the electrically floating state.

The dummy module DU2 includes dummy electrodes DR2 which are spaced part from each other by gaps. The dummy electrodes DR2 are also disposed so as to be spaced apart from the first detection electrodes Rx1. In the present embodiment, the dummy modules DU2 are opposed to the first detection electrodes Rx1.

The second detection electrodes Rx2 and the dummy modules DU2 are formed of a transparent conductive material such as ITO, IZO, or ZnO. The lead lines L2 may be formed of a transparent conductive material such as ITO, IZO or ZnO, similarly to the second detection electrodes Rx2 and the like, but may be formed of metal instead of the transparent conductive material.

Since gaps are formed between the dummy electrodes DR2 as explained above, signals can be transmitted from the common electrodes CE to the first detection electrodes Rx1 through the gaps. For example, the common electrodes CE and the first detection electrodes Rx1 can be subjected to electrostatic capacitive coupling.

In addition, since gaps are also formed between the dummy electrodes DR1, a conductor such as a finger and the second detection electrodes Rx2 can be subjected to electrostatic capacitive coupling through the gaps.

Next, a display driving operation executed to display images at the liquid crystal display device DSP in the above-explained FFS mode will be explained.

First, an off state in which no voltage is applied to the liquid crystal layer LC is explained. The off state corresponds to a state in which a potential difference is not formed between the pixel electrode PE and the common electrode CE. In such an off state, liquid crystal molecules in the liquid crystal layer LC are subjected to initial alignment in the same orientation within the X-Y plane by the alignment restriction force of alignment films of the first substrate SUB1 and the second substrate SUB2. Part of the light from the backlight unit BL transmits a polarizer of the first optical element OD1 and is incident on the liquid crystal display panel PNL. The light incident on the liquid crystal display panel PNL is linearly polarized light which is orthogonal to an absorption axis of the polarizer. The polarized state of the linearly polarized light hardly changes when the linearly polarized light passes though the liquid crystal display panel PNL in the off state. For this reason, most of the linearly polarized light which has passed through the liquid crystal display panel PNL is absorbed by the polarizer of the second optical element OD2 (black display). A mode in which the liquid crystal display panel PNL thus becomes a black display in the off state is called a normally-black mode.

Next, the on state in which a voltage is applied to the liquid crystal layer LC will be explained. The on state corresponds to a state in which a potential difference is formed between the pixel electrode PE and the common electrode CE. In other words, a common driving signal (common voltage) is supplied from the common electrode driving circuit CD to the common electrodes CE. In contrast, a video signal to form a potential difference relative to the common voltage is supplied to the pixel electrodes PE. A fringing field is thereby formed between the pixel electrode PE and the common electrode CE, in the on state.

In the on state, the liquid crystal molecules are aligned in the orientation different from the initial alignment orientation within the X-Y plane. In the on state, the linearly polarized light orthogonal to the absorption axis of the polarizer of the first optical element OD1 is incident on the liquid crystal display panel PNL and its polarization state is varied in response to the alignment of the liquid crystal molecules when passing through the liquid crystal layer LC. For this reason, at least part of the light which has passed through the liquid crystal layer LC transmits the polarizer of the second optical element OD2 (white display), in the on state.

Next, an operation executed at the sensing driving for sensing to detect contact or approach of a conductor to the input surface IS of the liquid crystal display device DSP will be explained. A driving module composed of the driver IC chips IC1 and IC2 and the control module CM of the liquid crystal display device DSP controls driving of the common electrodes CE, the first detection electrodes Rx1 and the second detection electrodes Rx2 by switching the mode to either of the first mode and the second mode, and executes sensing. In some cases, the first mode is often called a self-capacitive sensing mode and the second mode is often called a mutual-capacitive sensing mode.

<First Mode>

First, the first mode to detect first input position information by at least one of the first detection module D1 and the second detection module D2 will be explained. The first mode has a feature that the input position can be roughly detected in a short time in the entire input area.

Figure 9:
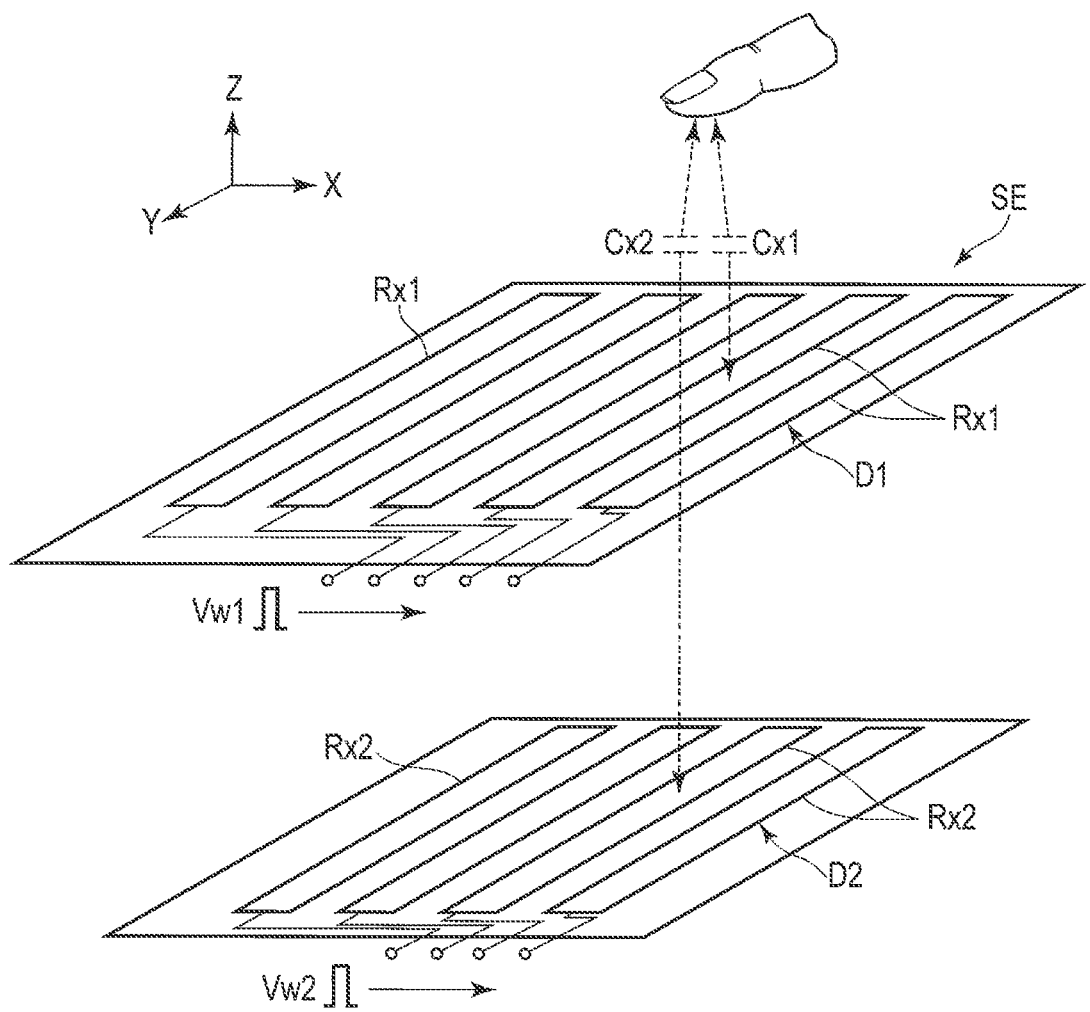
FIG. 9 is an illustration for explaining a principle of an example of a sensing method in a first mode.
Figure 10:
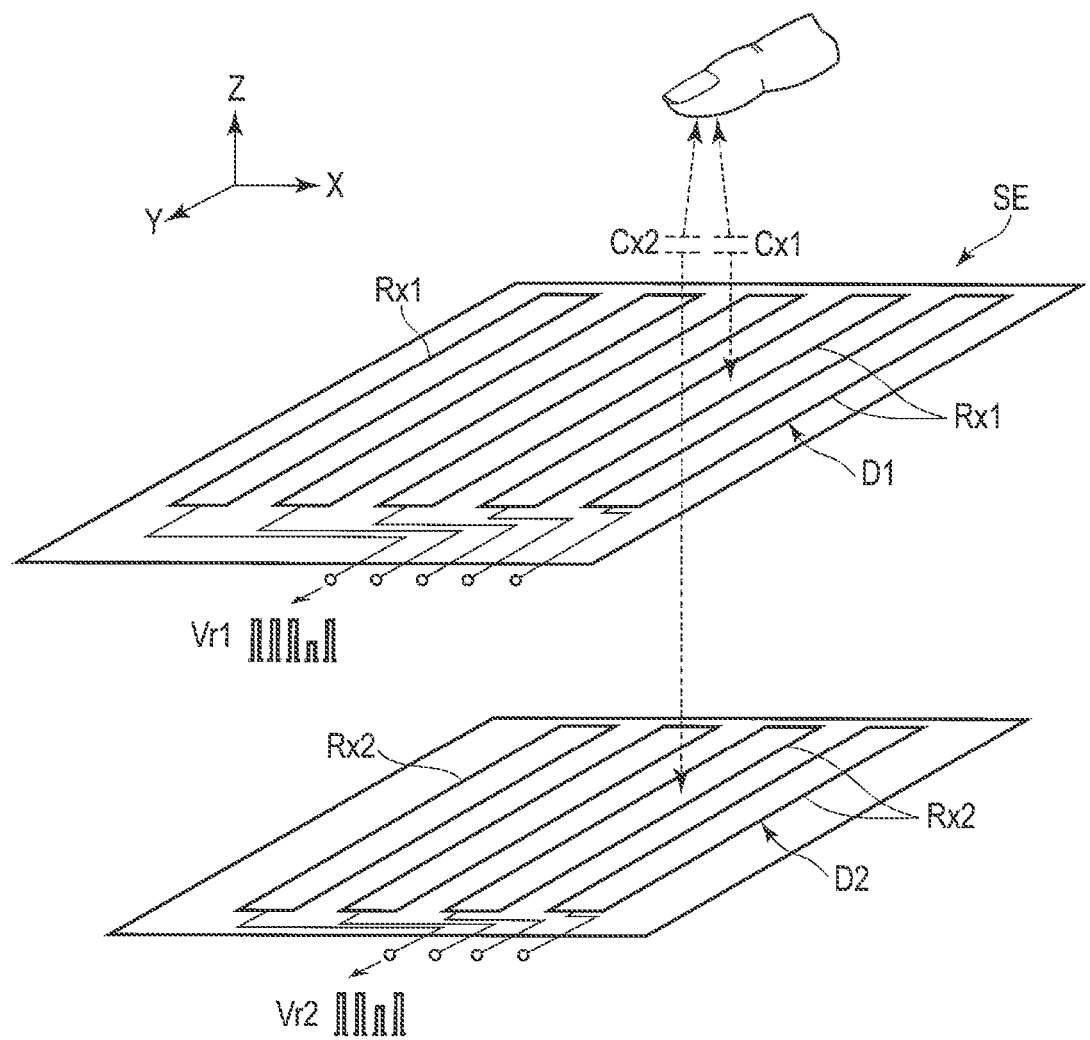
FIG. 10 is an illustration for explaining a principle of an example of the sensing method in the first mode, subsequently with FIG. 9.

As illustrated in FIG. 9, first, the driver IC chip IC2 writes a write signal Vw1 to each first detection electrode Rx1 and writes a write signal Vw2 to each second detection electrode Rx2. For example, the write signal Vw1 is the same as the write signal Vw2. As illustrated in FIG. 10, then, the driver IC chip IC2 reads a read signal Vr1 from the first detection electrode Rx1 and reads a read signal Vr2 from the second detection electrode Rx2. The read signal Vr1 indicates variation of a sensor signal generated at the first detection electrode Rx1 by the write signal Vw1. The read signal Vr2 indicates variation of a sensor signal generated at the second detection electrode Rx2 by the write signal Vw2.

As illustrated in FIG. 9 and FIG. 10, in this example, a user's finger approaches the first detection electrode Rx1 at the second position from the right and the second detection electrode Rx2 at the second position from the right, and electrostatic capacitive coupling occurs between each of the detection electrodes and the finger. In the read signal Vr1 read from the first detection electrode Rx1 at the second position from the right, a greater variation in voltage value occurs than that in the read signal Vr1 read from the other first detection electrode Rx1. Similarly, in the read signal Vr2 read from the second detection electrode Rx2 at the second position from the right, a greater variation in voltage value occurs than that in the read signal Vr2 read from the other second detection electrode Rx2.

For this reason, an area opposed to the first detection electrode Rx1 at the second position from the right and the second detection electrode Rx2 at the second position from the right can be recognized as an X coordinate of the input position. In other words, the finger's contact or approach to the input surface IS of the liquid crystal display device DSP, in the area opposed to the first detection electrode Rx1 and the second detection electrode Rx2, can be detected.

In the first mode, both the first detection module D1 and the second detection module D2 may be used or either of the first detection module D1 and the second detection module D2 may be used. In this case, the driver IC chip IC2 writes the write signal Vw2 to the detection electrode of either of the first detection module D1 and the second detection module D2 and reads the read signal from the detection electrode. Thus, the input position may be roughly detected by using either of the detection modules.

In the first mode, however, it can be determined whether the finger (conductor) is in contact with the input surface IS or not or how far the finger approaches the input surface IS, by using both the first detection module D1 and the second detection module D2. In other words, the proximity of the finger (conductor) to the input surface IS can be determined.

Figure 11:
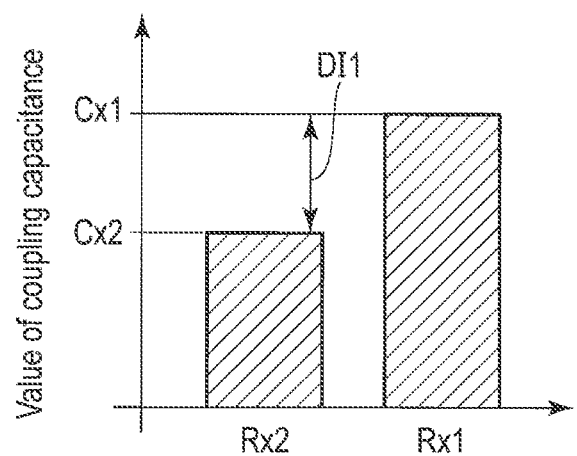
FIG. 11 is a graph showing a first difference between a value of a first coupling capacitance of the first detection electrode and a finger, and a value of a second coupling capacitance of the second detection electrode and a finger, in a state in which a finger is in contact with an input surface of the liquid crystal display device.
Figure 12:
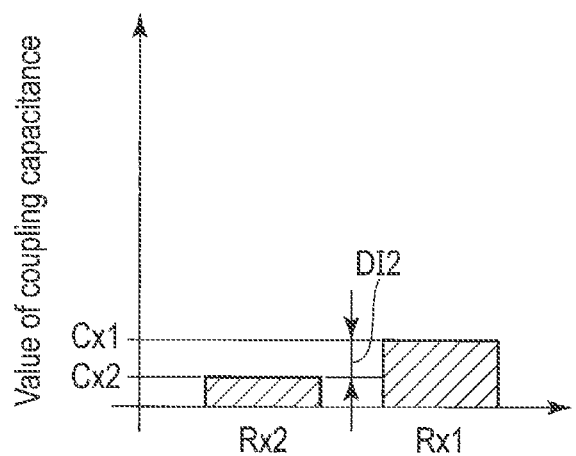
FIG. 12 is a graph showing a second difference between a value of a first coupling capacitance of the first detection electrode and a finger, and a value of a second coupling capacitance of the second detection electrode and a finger, in a state in which a finger is close to the input surface of the liquid crystal display device.

FIG. 11 is a graph showing a first difference DI1 between a value of a first coupling capacitance Cx1 of the first detection electrode Rx1 and a finger, and a value of a second coupling capacitance Cx2 of the second detection electrode Rx2 and a finger, in a state in which the finger is in contact with the input surface IS of the liquid crystal display device DSP. FIG. 12 is a graph showing a second difference DI2 between a value of the first coupling capacitance Cx1 of the first detection electrode Rx1 and a finger, and a value of the second coupling capacitance Cx2 of the second detection electrode Rx2 and a finger, in a state in which the finger approaches the input surface IS of the liquid crystal display device DSP.

As shown in FIG. 11 and FIG. 12, the first coupling capacitance Cx1 is varied when the finger is close to or remote from the first detection electrode Rx1, and the first coupling capacitance Cx1 becomes greater as the finger is closer to the first detection electrode Rx1. Similarly, the second coupling capacitance Cx2 is varied when the finger is close to or remote from the second detection electrode Rx2, and the second coupling capacitance Cx2 becomes greater as the finger is closer to the second detection electrode Rx2. In addition, the first detection electrode Rx1 is located at a position closer to the input surface IS side than the second detection electrode Rx2. For this reason, the variation in the first coupling capacitance Cx1 becomes greater in accordance with the variation in distance between the input surface IS and the finger. In contrast, the variation in the second coupling capacitance Cx2 caused in accordance with the variation in distance between the input surface IS and the finger becomes smaller as compared with the variation in the first coupling capacitance Cx1. As the finger is closer to the input surface IS, the difference between the first coupling capacitance Cx1 and the second coupling capacitance Cx2 becomes greater. It can be recognized that the second difference DI2 is smaller than the first difference DI1. For this reason, the difference between the read signal Vr1 and the read signal Vr2 which corresponds to the above-explained difference, can be calculated and the proximity of the finger to the input surface IS (i.e., the distance in a normal direction of the sensor SE) can be determined based on the magnitude of the difference. For example, it can be determined that the finger is in contact with the input surface IS when the difference between the read signal Vr1 and the read signal Vr2 exceeds a threshold value, and it can be determined that the finger is located away from the input surface IS when the difference between the read signal Vr1 and the read signal Vr2 is below the threshold value.

<Second Mode>

Next, the second mode to detect second input position information by a combination of the common electrode CE with at least one of the first detection module D1 and the second detection module D2 will be explained. The second mode has a feature that an X coordinate and a Y coordinate of the input position can be detected in detail in at least a part of the input area.

Figure 13:
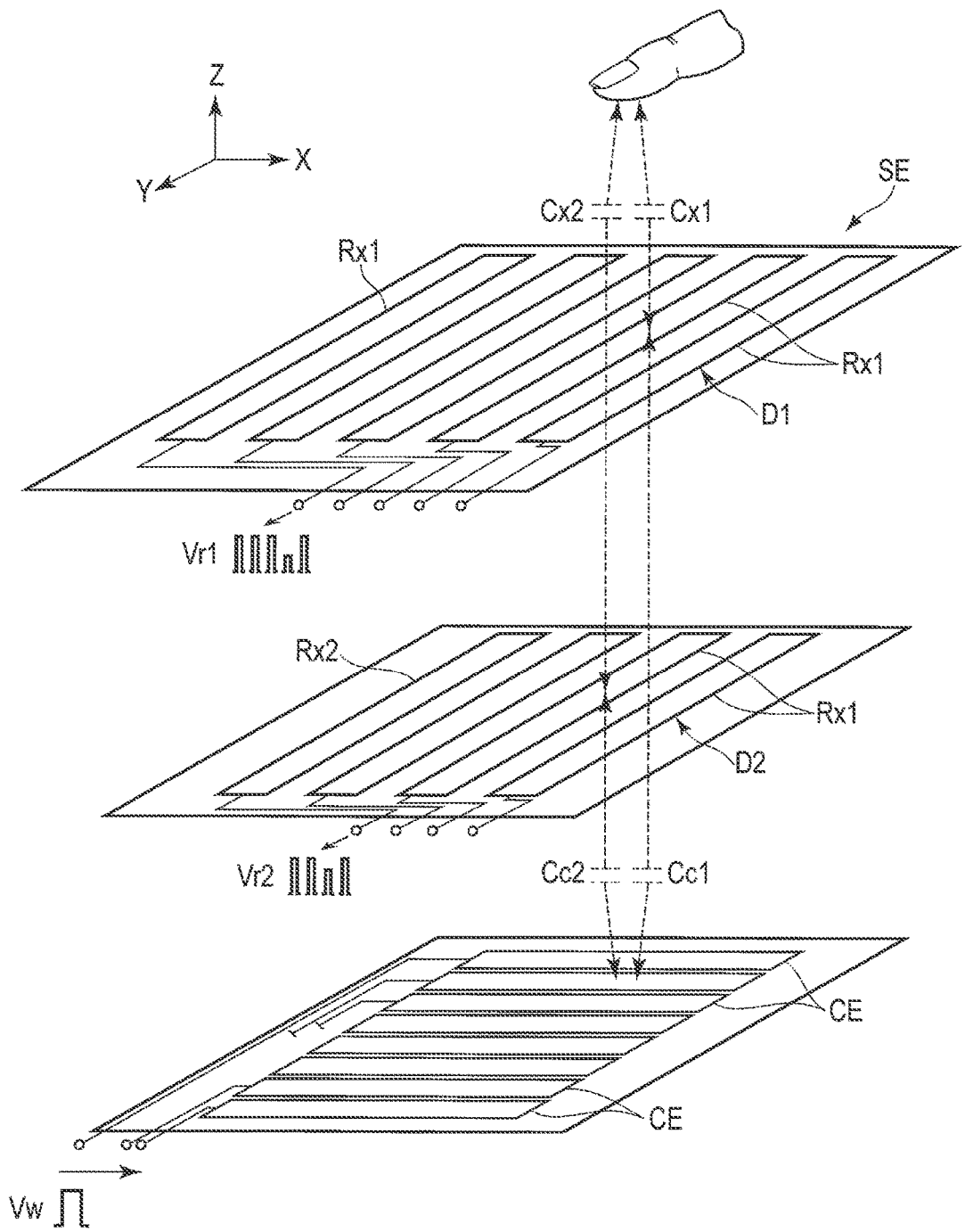
FIG. 13 is an illustration for explaining the principle of an example of the sensing method in a second mode.

As illustrated in FIG. 13, a capacitance Cc1 exists between the common electrode CE and the first detection electrode Rx1, and a capacitance Cc2 exists between the common electrode CE and the second detection electrode Rx2. In other words, each of the first detection electrode Rx1 and the second detection electrode Rx2 is subjected to electrostatic capacitive coupling with the common electrode CE. In this example, the user's finger exists at a position close to a position where the common electrode CE at the third position from the upper and the first detection electrode Rx1 at the second position from the right intersect, and a position where the common electrode CE at the third position from the upper and the second detection electrode Rx2 at the second position from the right intersect. The first coupling capacitance Cx1 is generated when the user's finger approaches the first detection electrode Rx1, and the second coupling capacitance Cx2 is generated when the user's finger approaches the second detection electrode Rx2.

First, the driver IC chip IC1 writes a pulse-shaped write signal (sensor driving signal) Vw to the common electrode CE, to generate sensor signals between the common electrode CE and the first detection electrode Rx1, and between the common electrode CE and the second detection electrode Rx2. Then, the driver IC chip IC2 reads the read signal Vr1 indicative of a variation in the sensor signal (for example, capacitance generated at the first detection electrode Rx1) from the first detection electrode Rx1, and reads the read signal Vr2 indicative of a variation in the sensor signal (for example, capacitance generated at the second detection electrode Rx2) from the second detection electrode Rx2. The second input position information can be detected, based on the timing at which the write signal Vw is supplied to the common electrodes CE, and the read signals Vr1 and Vr2 from the detection electrodes.

The detection of the input position information in the second mode can be executed after the input position information of the finger is roughly detected in the first mode. In the above example, since it has been specified in the first mode that the input is made to the area opposed to the first detection electrode Rx1 at the second position from the right and the second detection electrode Rx2 at the second position from the right, the X coordinate and the Y coordinate of the input position may be detected in detail in the second mode, in the above-explained area alone or a vicinity to the above-explained area alone.

In the second mode, both the first detection module D1 and the second detection module D2 may be used or either of the first detection module D1 and the second detection module D2 may be used. In this case, the driver IC chip IC2 reads the read signal from the detection electrode of either of the first detection module D1 and the second detection module D2. Thus, the input position may be detected by using either of the detection modules.

In the second mode, too, however, the degree of approach of the finger (conductor) to the input surface IS can be determined based on the value of the read signal Vr1 and the value of the read signal Vr2, by using both the first detection module D1 and the second detection module D2, similarly to the first mode.

The display driving and the sensing driving are executed within, for example, one frame period. For example, one frame period is divided into a first period and a second period. In the first period, the display driving of writing video signals to all the pixels PX of the display area DA is executed in time division (display period). In the second period following the first period, the sensing driving of detecting a to-be-detected object in the entire display area DA is executed in time division (touch detection period or sensing period).

In another example, one frame period is further divided into plural periods. The display area DA is divided into blocks, and the display driving and the sensing driving are executed in each block. In other words, in a first period of the frame period, first display driving of writing video signals to the pixels PX of a first display block of the display area DA is executed. In a second period following the first period, first sensing driving of detecting the to-be-detected object in a first sensing block of the display area DA is executed. The first sensing block and the first display block may be the same areas or different areas. In a third period following the second period, second display driving of writing video signals to the pixels of a second display block different from the first display block is executed. In a fourth period following the third period, second sensing driving of detecting the to-be-detected object in a second sensing block different from the first sensing block is executed. Thus, the to-be-detected object can be detected in the entire display area DA while alternately executing the display driving and the sensing driving within one frame period and writing the video signals to all the pixels PX of the display area DA. In each sensing period, both detection of the first position of input position information in the first mode and detection of the second position of input position information in the second mode following the detection of the first position may be executed.

According to the sensor-equipped liquid crystal display device DSP of the first embodiment constituted as mentioned above, the liquid crystal display device DSP comprises the liquid crystal display panel PNL, the cover member CG, the polarizer (second optical element OD2), and the first detection module D1. The liquid crystal display panel PNL includes the pixel electrodes PE and the stripe-shaped common electrodes CE, which are located in the display area DA1. The cover member CG is opposed to the liquid crystal display panel PNL. The polarizer (second optical element OD2) is located between the liquid crystal display panel PNL and the cover member CG. The first detection module D1 is located between the polarizer and the cover member CG. For this reason, for example, the first input position information can be detected by using the first detection module D1 in the first mode and the second input position information can be detected by using the common electrodes CE and the first detection module D1 in the second mode.

Incidentally, the first detection module D1 is located on the side closer to the user than to the polarizer. For this reason, the user can visually recognize the pattern of the first detection module D1 as compared with a case where the first detection module D1 is located on the side opposite to the polarizer as seen from the user.

In the first embodiment, however, the first detection module D1 comprises the first detection electrodes Rx1 including the dot-like openings OP and the dummy modules DU1 including the dot-like dummy electrodes DR1. For this reason, the pattern of the first detection module D1 can hardly be recognized visually for the user even if the first detection module D1 is located on the side closer to the user than to the polarizer. The sensor-equipped liquid crystal display device DSP having excellent display quality can be therefore obtained.

First Modified Example of First Embodiment

Figure 14:
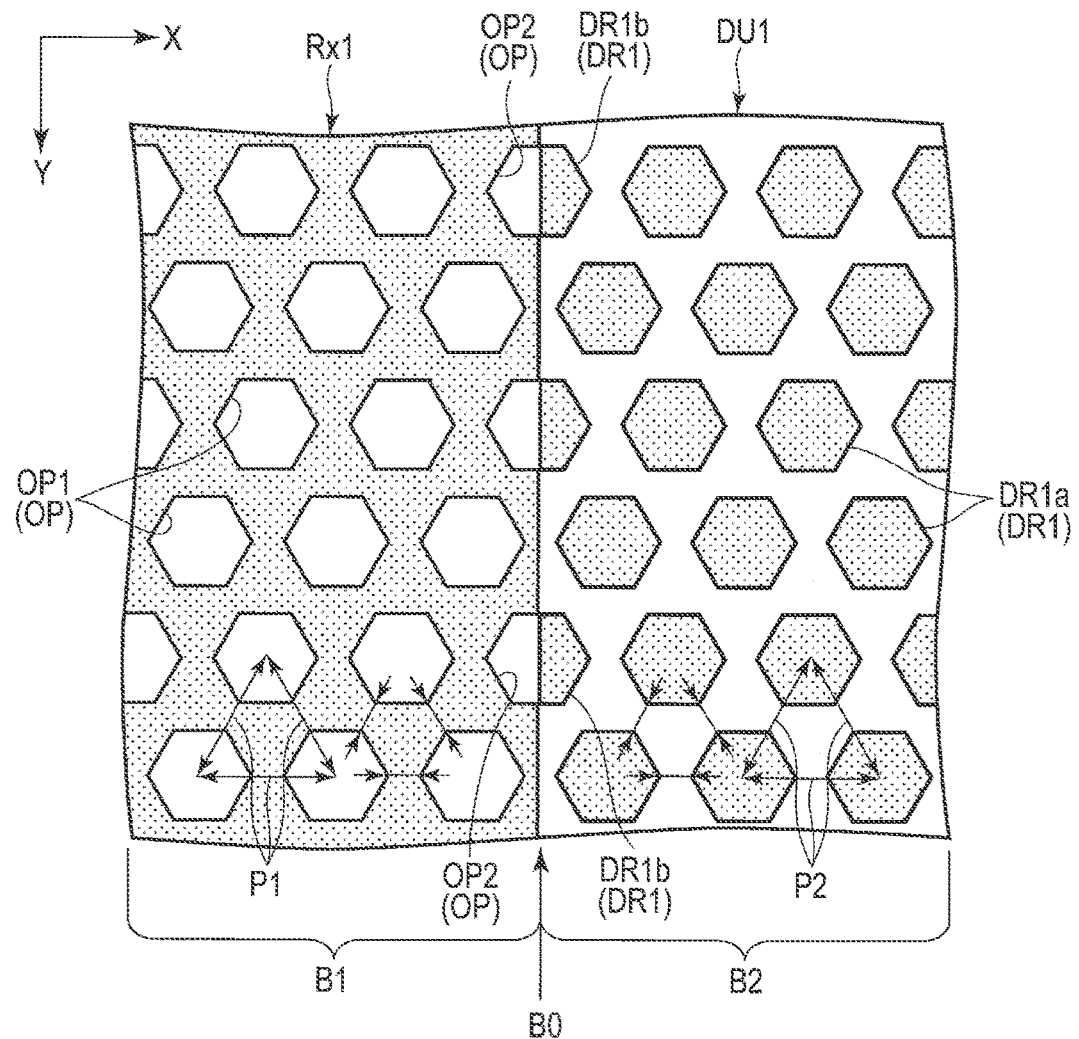
FIG. 14 is a view showing a part of the first detection module of the liquid crystal display device according to a first modified example of the first embodiment, illustrating the first detection electrode and the dummy electrodes.

Next, a sensor-equipped liquid crystal display device DSP of a first modified example of the first embodiment will be explained. FIG. 14 is a plan view showing a part of the first detection module D1 of the liquid crystal display device DSP according to a first modified example of the first embodiment, illustrating the first detection electrode Rx1 and the dummy electrode DR1.

As shown in FIG. 14, each of the openings OP and the dummy electrodes DR1 may be shaped in a regular polygon. Examples of the regular polygon are polygons in a category from a regular hexagon to a regular icosagon such as a regular hexagon, a regular octagon, a regular decagon, a regular dodecagon, a regular hexadecagon, and a regular icosagon. In the present modified example, each of the openings OP and the dummy electrodes DR1 is shaped in a regular hexagon. The opening OP and the dummy electrode DR1 have the same size (area).

A pattern in which the openings OP are arranged is the same as a pattern in which the dummy electrodes DR1 are arranged, and the arrangement is regular in the present modified example, too. All the openings OP and the dummy electrodes DR1 are arranged at equal pitches P1 and P2 (P1=P2). Corners of adjacent openings OP or corners of adjacent dummy electrodes DR1 are positioned to be spaced apart from each other, in the direction in which the openings OP and the dummy electrodes DR1 are arranged.

The openings OP include first openings OP1 shaped in a regular hexagon and second openings OP2 having a shape formed by dividing a regular hexagon having the same shape as the first openings OP1 by a longest diagonal line. The dummy electrodes DR1 include first dummy electrodes DR1*a* shaped in a regular hexagon and second dummy electrodes DR1*b* having a shape formed by dividing a regular hexagon having the same shape as the first dummy electrodes DR1*a* by a longest diagonal line.

In the present modified example, too, the first detection electrode Rx1 and the dummy electrodes DR1 are desirably disposed such that the shapes of regular hexagon are formed by the second openings OP2 and the second dummy electrodes DR1*b*. A proportion of the area of the first detection electrode Rx1 to the sensor region B1 is equal to a proportion of the total area of the dummy electrodes DR1 to the dummy region B2.

In the sensor-equipped liquid crystal display device DSP according to the first modified example of the first embodiment constituted as explained above, too, the same advantages as those obtained in the first embodiment can be obtained.

Second Modified Example of First Embodiment

Figure 15:
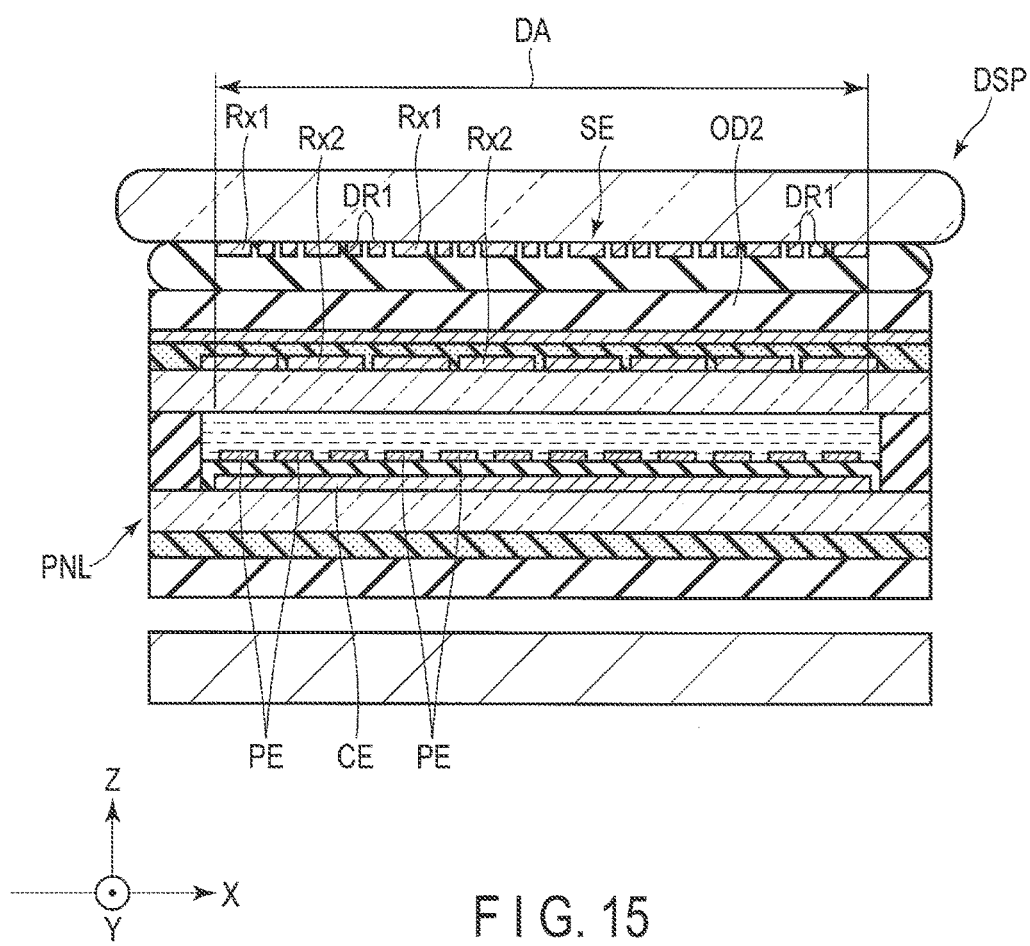
FIG. 15 is a cross-sectional view showing a configuration of a liquid crystal display device according to a second modified example of the first embodiment.

Next, a sensor-equipped liquid crystal display device DSP of a second modified example of the first embodiment will be explained. FIG. 15 is a cross-sectional view showing a configuration of the liquid crystal display device DSP according to a second modified example of the first embodiment.

As shown in FIG. 15, the second detection electrode Rx2 may extend along the first detection electrodes Rx1 so as to be opposed to the first detection electrodes Rx1 in the third direction Z. The width of each first detection electrode Rx1 is smaller than the width of each second detection electrode Rx2, in the first direction X. The dummy electrodes DR1 are disposed between the first detection electrodes Rx1. A dummy electrode DR2 is disposed between the second detection electrodes Rx2 though not shown.

In the present modified example, too, since gaps are formed between the dummy electrodes DR2 of the second detection module, signals can be transmitted from the common electrodes CE to the first detection electrodes Rx1 through the gaps. For example, the common electrode CE and the first detection electrode Rx1 can be subjected to electrostatic capacitive coupling. In the present modified example, the second detection electrodes Rx2 may include openings to transmit the signals from the common electrode CE to the first detection electrodes Rx1.

In addition, since gaps are also formed between the dummy electrodes DR1 of the first detection module, a conductor such as a finger and the second detection electrodes Rx2 can be subjected to electrostatic capacitive coupling through the gaps and the openings OP.

In the sensor-equipped liquid crystal display device DSP according to the second modified example of the first embodiment constituted as explained above, too, the same advantages as those obtained in the first embodiment can be obtained.

Second Embodiment

Figure 16:
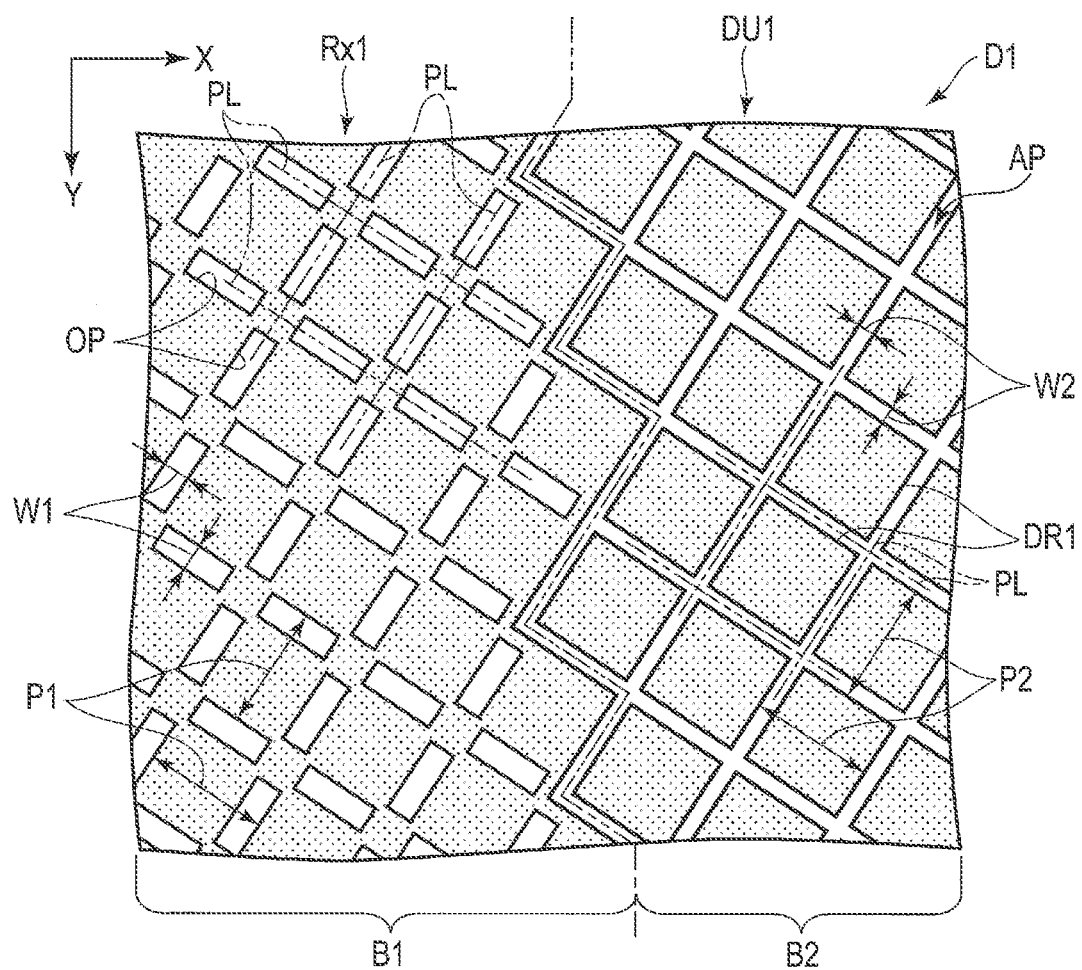
FIG. 16 is a plan view showing a part of a first detection module of a liquid crystal display device of a second embodiment, illustrating a first detection electrode and dummy electrodes.

Next, a sensor-equipped liquid crystal display device DSP of a second embodiment will be described in detail. FIG. 16 is a plan view showing a part of a first detection module D1 of the liquid crystal display device DSP according to the second embodiment, illustrating a first detection electrode Rx1 and dummy electrodes DR1. The present embodiment is different from the above-explained first embodiment with respect to the first detection module D1 but the same as the first embodiment with respect to the other constituent elements. In the following descriptions, like or similar constituent elements as those explained above are denoted by like reference numerals and their explanations are omitted.

As shown in FIG. 16, the first detection module D1 comprises the first detection electrodes Rx1 and dummy modules DU1. The first detection electrode Rx1 includes openings OP. The openings OP are formed to extend along imaginary grid lines PL and spaced apart from each other. The openings OP are formed in rectangle shape. The openings OP are arranged at positions opposed to points of intersection of the imaginary grid lines so as to be spaced apart from each other.

The dummy electrodes DR1 are formed in tetragon shape and arrayed in matrix. The dummy electrodes DR1 cause a grid-shaped gap portion AP to appear along the imaginary grid lines PL.

All the openings OP and the dummy electrodes DR1 are arranged at equal pitches P1 and P2 (P1=P2). A direction in which the openings OP and the dummy electrodes DR1 are arranged is not particularly limited and can be variously adjusted. Desirably, however, the openings OP and the dummy electrodes DR1 are arranged at equal pitches in a first arrangement direction which is inclined clockwise at an angle in a range of 30 to 35° from the second direction Y, and a second arrangement direction which is orthogonal to the first arrangement direction, in view of the X-Y plane. This is because moire with the layout of the pixels PX can be suppressed and the deterioration in display quality can also be suppressed by adjusting the arrangement directions.

The pitches P1 and P2 at which the openings OP and the dummy electrodes DR1 are arranged range from approximately 50 to 150 μm but are not limited to this range and can be variously adjusted. However, the pitches are desirably made to correspond to the pitches of the pixels PX. This is because moire with the layout of the pixels PX can also be suppressed and the deterioration in display quality can also be suppressed by adjusting the arrangement directions.

A proportion of the area of the first detection electrode Rx1 to a sensor region B1 may be equal to a proportion of the total area of the dummy electrodes DR1 to a dummy region B2. The pattern of the first detection electrode Rx1 and the dummy module DU1 can hardly be thereby recognized visually for the user.

In the second embodiment, the proportion of the area of the first detection electrode Rx1 to the sensor region B1 is equal to the proportion of the total area of the dummy electrodes DR1 to the dummy region B2. Thus, a width W1 of each of the openings OP is made different from a width W2 of the gap portion between the dummy electrodes DR1. The widths W1 and W2 are widths of directions orthogonal to the imaginary grid lines PL. More specifically, the width W1 of each of the openings OP is greater than the width W2 of the gap portion between the dummy electrodes DR1. For example, the width W1 is in a range from approximately 10 to 17 μm, and the width W2 is in a range from approximately 7 to 13 μm.

According to the sensor-equipped liquid crystal display device DSP of the second embodiment constituted as mentioned above, the liquid crystal display device DSP comprises the liquid crystal display panel PNL, the cover member CG, the polarizer (second optical element OD2), and the first detection module D1. In the second embodiment, the first detection module D1 comprises the first detection electrodes Rx1 including the openings OP which are formed to extend along the imaginary grid lines and arranged to be spaced apart from each other and the dummy module DU1 including the dummy electrodes DR1 which are arrayed in matrix and which cause the grid-like gap portion formed in the grid lines to appear. For this reason, the pattern of the first detection module D1 can hardly be recognized visually for the user even if the first detection module D1 is located on the side closer to the user than to the polarizer.

The sensor-equipped liquid crystal display device DSP having excellent display quality can be therefore obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the common electrode CE may extend in the second direction Y and each of the first detection electrodes Rx1 and the second detection electrodes Rx2 may extend in the first direction X.

The driver IC chip IC1 and the driver IC chip IC2 may be formed integrally. In other words, the driver IC chip IC1 and the driver IC chip IC2 may be integrated on a single driver IC chip. In this case, the single driver IC chip may be connected to the liquid crystal display panel PNL, the first detection module D1, the second detection module D2 and the control module CM to supply a common drive signal Vcom to the common electrodes CE, write the write signals to the common electrodes CE or at least either of the first detection electrodes Rx1 and the second detection electrodes Rx2, and read the read signals from at least either of the first detection electrodes Rx1 and the second detection electrodes Rx2.

The driving modules are not limited to the driver IC chips IC1 and IC2 and the control module CM, but can be variously modified so as to be capable of driving the liquid crystal display panel PNL and the sensor SE.

In the above-described embodiments, liquid crystal display devices have been disclosed as the display device by way of example. However, the above-described embodiments are applicable to all types of flat-panel display devices such as organic EL (electroluminescent) display devices, other self-luminous display devices, and electronic paper-type display devices including electrophoresis elements. It is needless to say that the above-described embodiments can be applied to middle or small display devices and large display devices without particular limitation.

What is claimed is:

1. A sensor-equipped display device, comprising:
a display panel including pixel electrodes and common electrodes located in a display area in which an image is displayed, wherein each of the common electrodes is formed in a band shape;
a cover member opposed to the display panel;
a polarizer located between the display panel and the cover member; and
a first detection module located between the polarizer and the cover member, wherein
the first detection module comprises a first detection electrode including dot-like openings and a dummy module including dot-like dummy electrodes,
the dot-like openings of the first detection electrode include first dot-like openings which are not in contact with a side of the first detection electrode,
the dot-like dummy electrodes include first dot-like dummy electrodes which are not in contact with the side of the first detection electrode,
each of the first dot-like openings and the first dot-like dummy electrodes has a same size, and a same shape,
the first dot-like openings are arranged at a first equal pitch in each of three directions inclined at an angle of 60° from one another,
the first dot-like dummy electrodes are arranged at a second equal pitch in each of three directions inclined at an angle of 60° from one another, and
the first equal pitch and the second equal pitch are equal.

2. The sensor-equipped display device of claim 1, wherein each of the first dot-like openings and the first dot-like dummy electrodes has the same shape of a circle.

3. The sensor-equipped display device of claim 1, wherein a pattern of arranging the first dot-like openings at the first detection electrode and a pattern of arranging the first dot-like dummy electrodes at the dummy module are the same as each other.

4. The sensor-equipped display device of claim 1, wherein each of the first dot-like openings is in a shape of a circle, the dot-like openings of the first detection electrode include second dot-like openings shaped in a half of the circle of the first dot-like openings,
each of the first dot-like dummy electrodes has a same shape as each of the first dot-like openings, the dot-like dummy electrodes include second dot-like dummy electrodes shaped in a half of the circle of the first dot-like dummy electrodes, and a diameter portion of each of the second dot-like openings and a diameter portion of each of the second dot-like dummy electrodes are located on a boundary between the first detection electrode and the dummy module and overlaid in a one-to-one relationship.

5. The sensor-equipped display device of claim 1, wherein a proportion of an area of the first detection electrode to a sensor region in which the first detection electrode is formed is equal to a proportion of a total area of the dot-like dummy electrodes to a dummy region in which the dummy module is formed.

6. The sensor-equipped display device of claim 1, wherein the first detection electrode is formed to extend to a non-display area outside the display area.

7. The sensor-equipped display device of claim 1, further comprising:

a second detection module having a second detection electrode and being located between the common electrodes and the polarizer.

8. The sensor-equipped display device of claim 7, wherein the first detection electrode is formed in a band shape to intersect the common electrodes, the second detection electrode is formed in a band shape, extends along the first detection electrode, and is opposed to the first detection electrode, and a width of the first detection electrode is smaller than a width of the second detection electrode.

9. The sensor-equipped display device of claim 7, wherein the first detection electrode is formed in a band shape to intersect the common electrodes, the second detection electrode is formed in a band shape and extends along the first detection electrode, and the first detection electrode and the second detection electrode are arranged in a direction orthogonal to a direction in which each of the first detection electrode and the second detection electrode extends.

* * * * *